(12) United States Patent
Radja et al.

(10) Patent No.: US 7,356,764 B2
(45) Date of Patent: Apr. 8, 2008

(54) SYSTEM AND METHOD FOR EFFICIENT PROCESSING OF XML DOCUMENTS REPRESENTED AS AN EVENT STREAM

(75) Inventors: Coumara D. Radja, Naperville, IL (US); Thomas H. Moog, Burr Ridge, IL (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 10/422,597

(22) Filed: Apr. 24, 2003

(65) Prior Publication Data

US 2004/0006741 A1 Jan. 8, 2004

Related U.S. Application Data

(60) Provisional application No. 60/375,241, filed on Apr. 24, 2002.

(51) Int. Cl.
*G06F 17/00* (2006.01)
(52) U.S. Cl. ...................................................... 715/513
(58) Field of Classification Search ................ 715/513, 715/531; 707/101
See application file for complete search history.

(56) References Cited

U.S. PATENT DOCUMENTS

| | | | | |
|---|---|---|---|---|
| 6,671,853 | B1 * | 12/2003 | Burkett et al. | 715/513 |
| 6,795,854 | B1 * | 9/2004 | Parker et al. | 709/223 |
| 6,874,121 | B1 * | 3/2005 | Mayer | 715/513 |
| 2003/0046317 | A1 * | 3/2003 | Cseri et al. | 707/513 |
| 2003/0172348 | A1 * | 9/2003 | Fry et al. | 715/513 |

* cited by examiner

*Primary Examiner*—Stephen Hong
*Assistant Examiner*—Adam M Queler
(74) *Attorney, Agent, or Firm*—Schwabe, Williamson & Wyatt, P.C.

(57) ABSTRACT

A method and apparatus are provided for processing a representation of an XML document to create a sequence of contiguous bytes for transfer from a source to a destination. The method includes the steps of parsing the representation of the XML document into a set of information items, determining a relationship among the information items from the representation of the XML document, assigning an operation code to each information element based upon the determined relationship, where each assigned operation code defines how the associated information should be interpreted at the destination and
forming the operation codes and information items into a sequence of contiguous bytes suitable for transfer from the source to the destination, said byte sequence not depending upon any memory address assigned to the byte sequence.

8 Claims, 11 Drawing Sheets

Organization of EventStream sequence of bytes

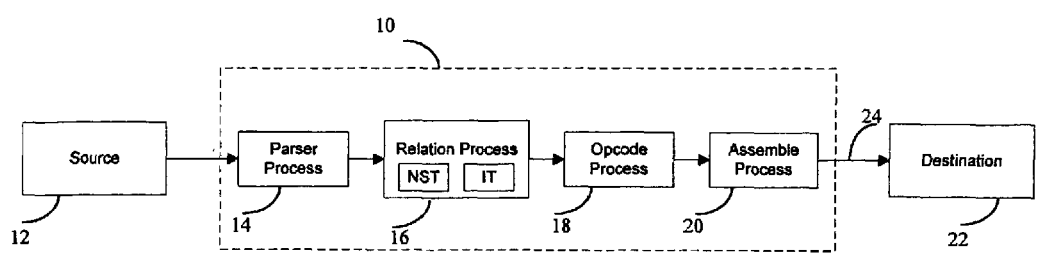
Fig. 1 Block diagram for EventStream construction

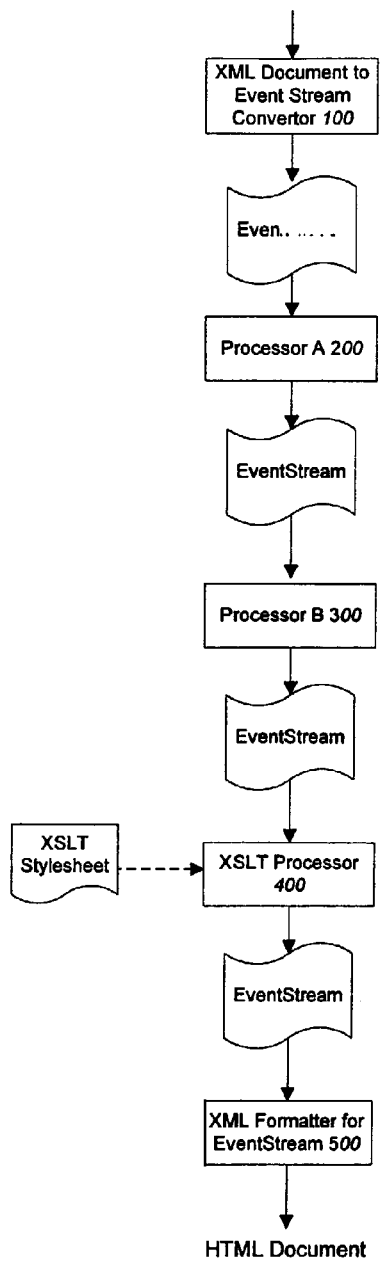
Fig. 2 Example pipeline based XML processing using EventStream

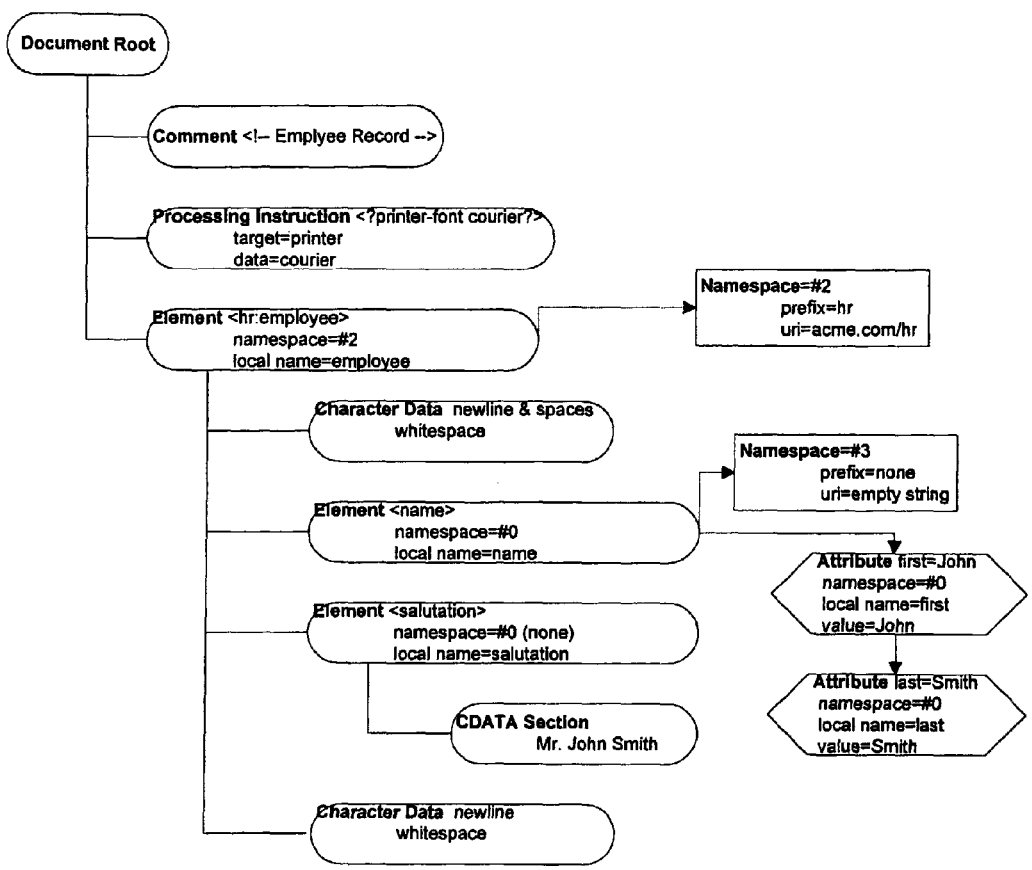
Fig. 3 XML Document as Object Model

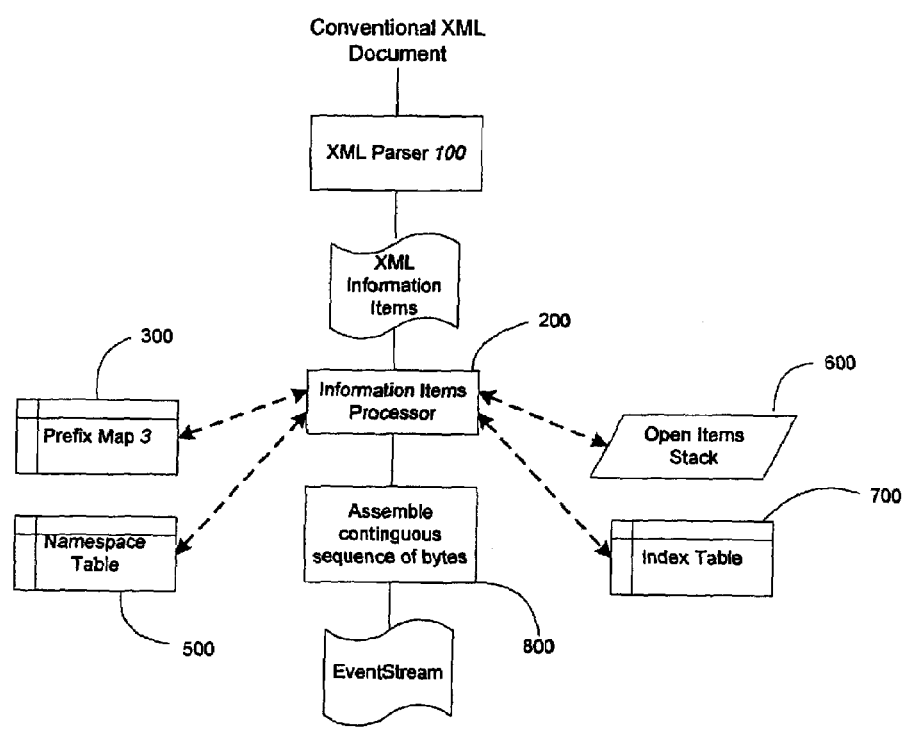
Fig. 4 Block diagram for XML document to EventStream converter

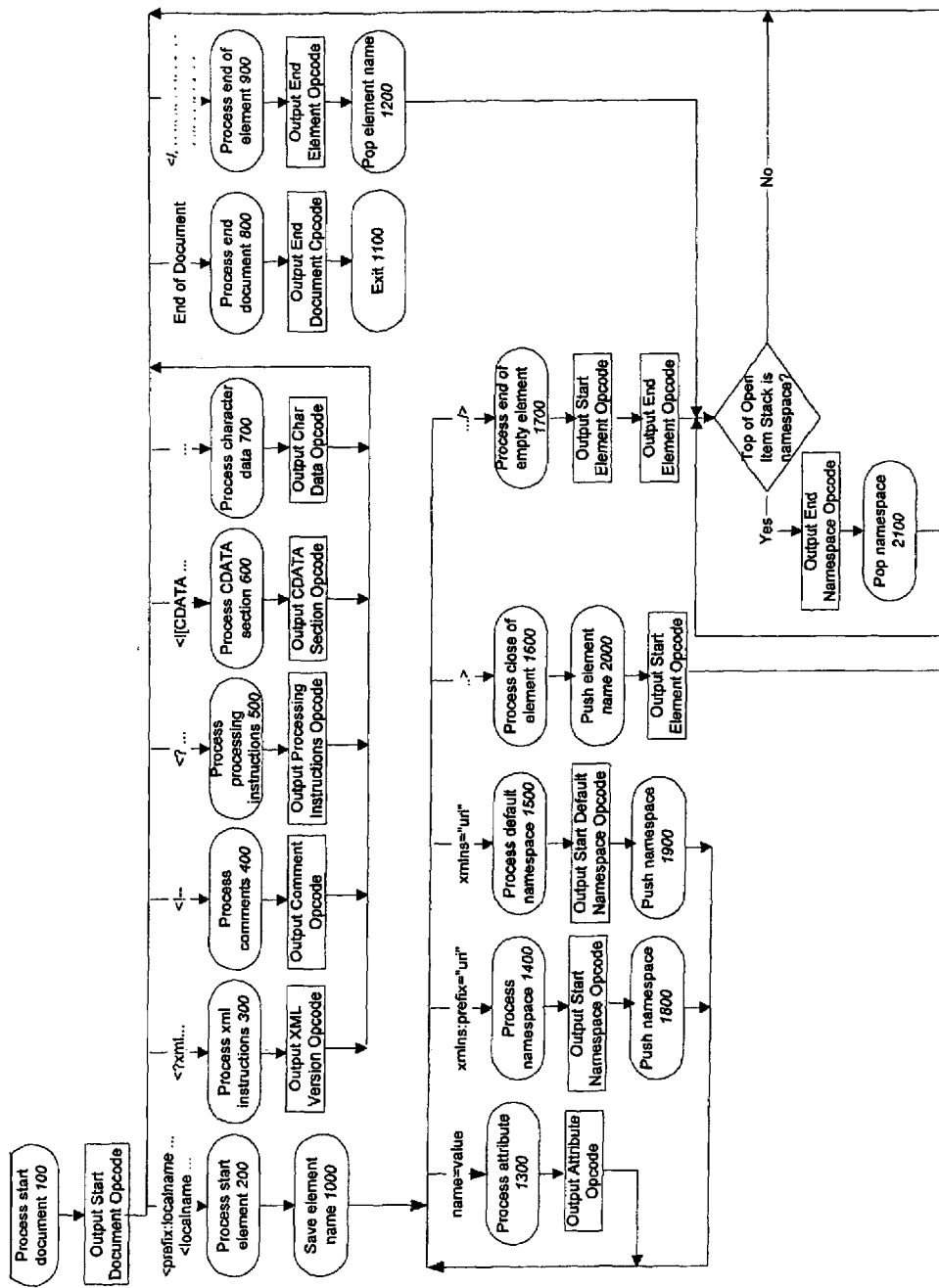
Fig. 5 Processing XML Information Items to create EventStream

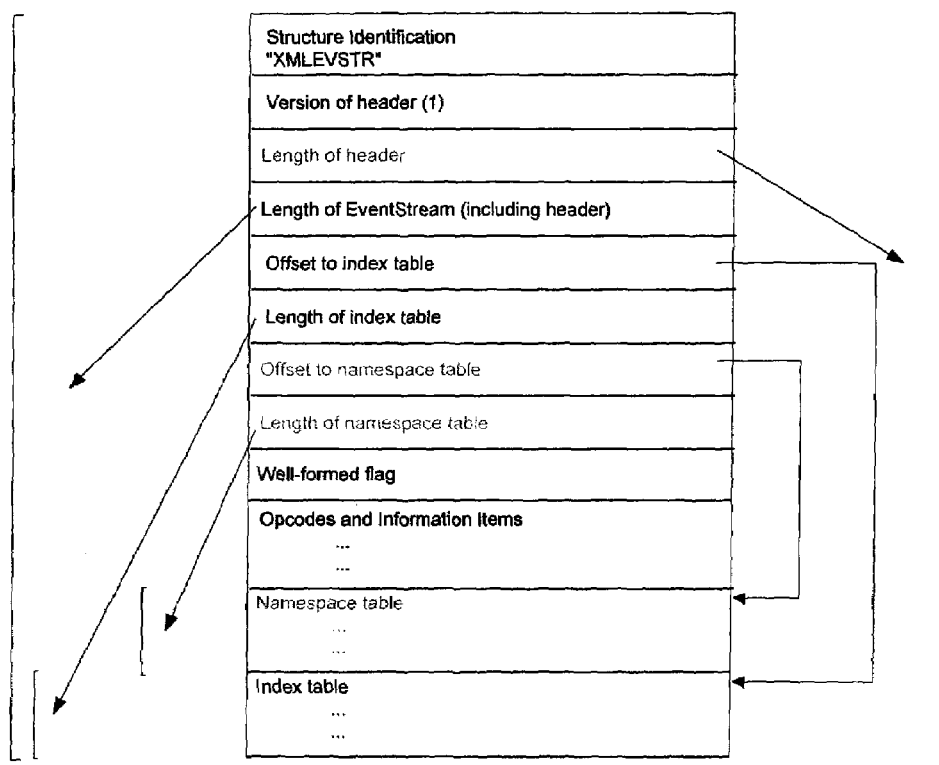
Fig. 6 Organization of EventStream sequence of bytes

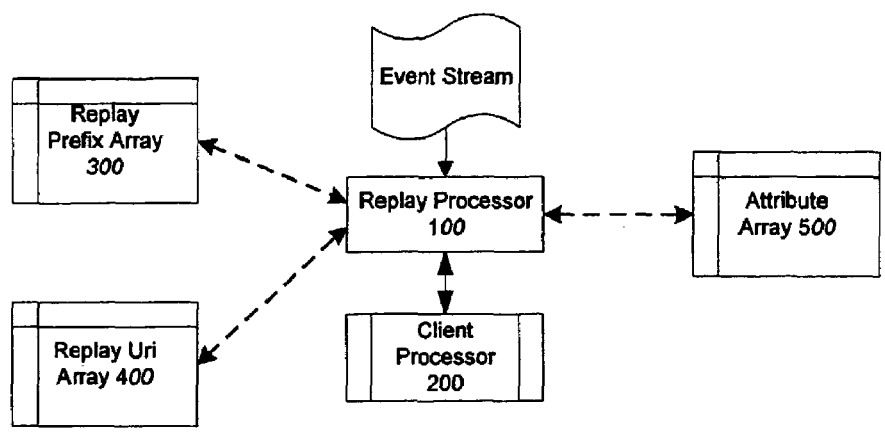
Fig. 7 Block diagram for EventStream Replay Processor

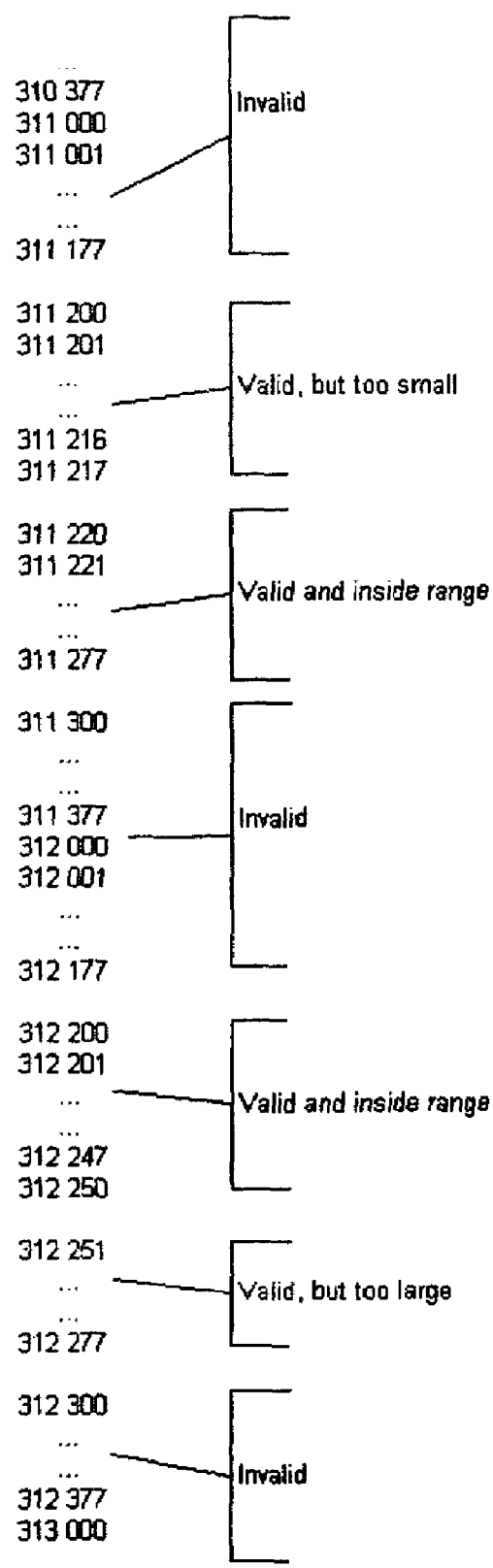
Fig. 8. UTF-8 Character Valid Ranges

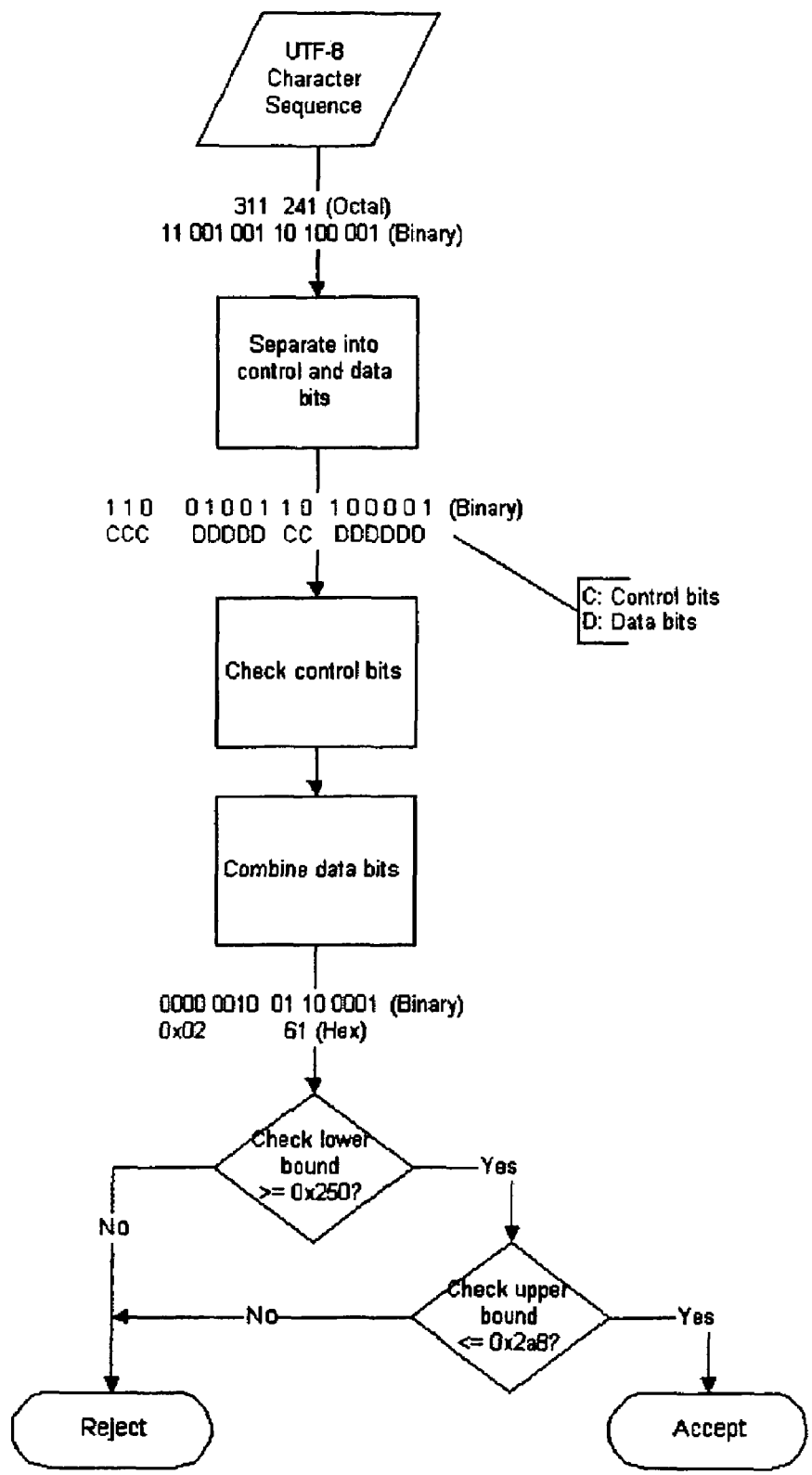
Fig. 9 Traditional Processing of UTF-8 Characters

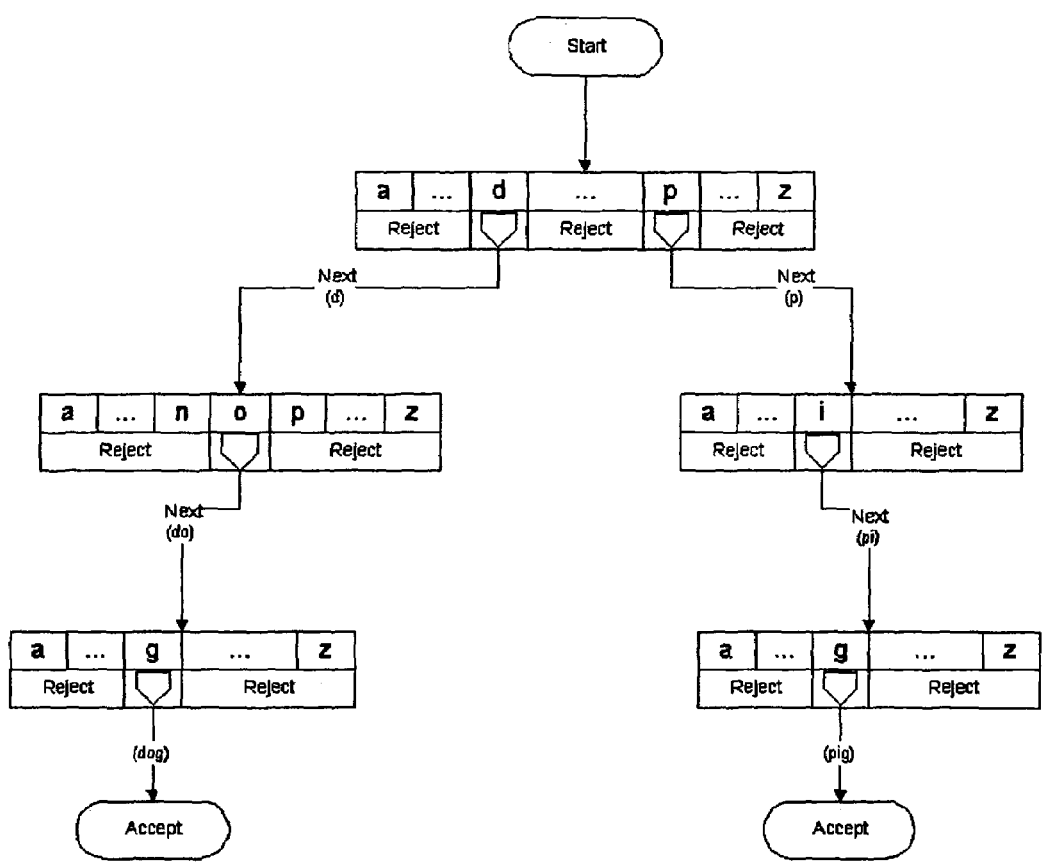
Fig. 10 Lexical Analyzer Example: recognizing dog or pig

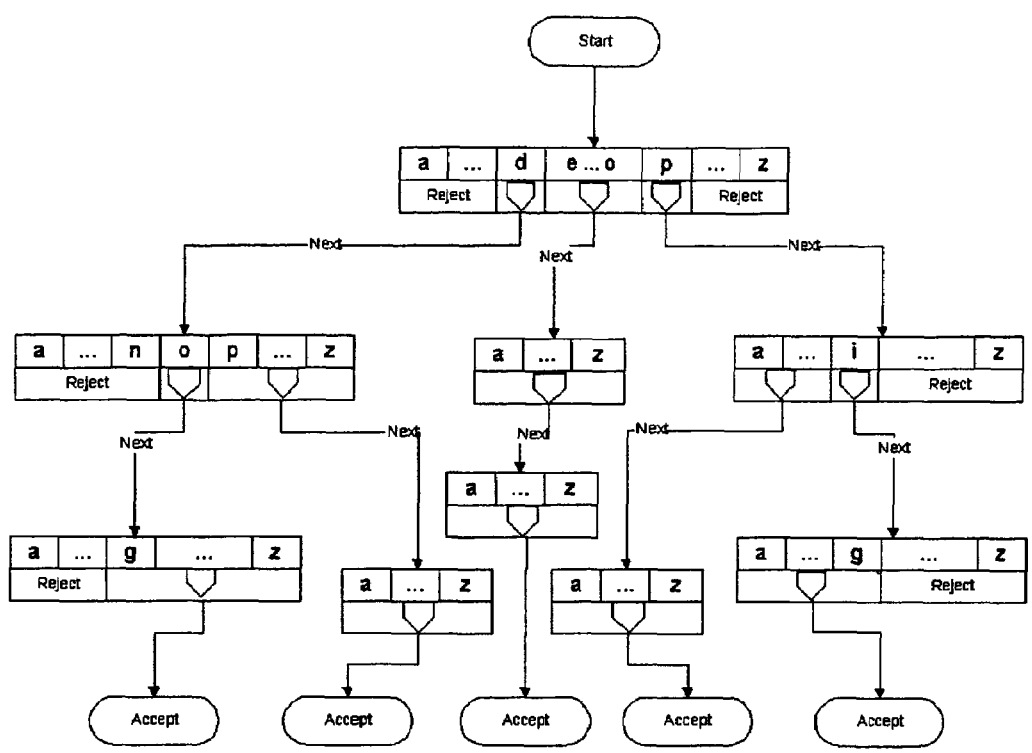
Fig. 11 Lexical Analyzer Example: Accept all words between dog and pig

SYSTEM AND METHOD FOR EFFICIENT PROCESSING OF XML DOCUMENTS REPRESENTED AS AN EVENT STREAM This application depends from U.S. Provisional Patent Application No. 60/375,241 filed on Apr. 24, 2002 (now abandoned).

FIELD OF THE INVENTION

The field of the invention relates to the encoding of documents and more particularly to encoding of documents under the XML format.

BACKGROUND OF THE INVENTION

Extensible Markup Language (XML) is a standardized text format that can be used for transmitting structured data to web applications. XML offers significant advantages over Hypertext Markup Language (HTML) in the transmission of structured data.

In general, XML differs from HTML in at least three different ways. First, in contrast to HTML, users of XML may define additional tag and attribute names at will. Second, users of XML may nest document structures to any level of complexity. Third, optional descriptors of grammar may be added to XML to allow for the structural validation of documents. In general, XML is more powerful, is easier to implement and easier to understand.

However, XML is not backward-compatible with existing HTML documents, but documents conforming to the W3C HTML 3.2 specification can be easily converted to XML, as can documents conforming to ISO 8879 (SGML). Further, while XML allows for increased flexibility, documents created under XML do not provide a convenient mechanism for searching or retrieval of portions of the document. Where large numbers of XML documents are involved, considerable time may be consumed searching for small portions of documents.

For example, in a business environment, XML may be used to efficiently encode information from purchase orders (PO). However, where a search must later be performed that is based upon certain information elements within the PO, the entire document must be searched before the information elements may be located. Because of the importance of information processing, a need exists for a better method of searching XML documents.

SUMMARY

A method and apparatus are provided for processing a representation of an XML document to create a sequence of contiguous bytes for transfer from a source to a destination. The method includes the steps of parsing the representation of the XML document into a set of information items, determining a relationship among the information items from the representation of the XML document, assigning an operation code to each information element based upon the determined relationship, where each assigned operation code defines how the associated information should be interpreted at the destination and forming the operation codes and information items into a sequence of contiguous bytes suitable for transfer from the source to the destination, said byte sequence not depending upon any memory address assigned to the byte sequence.

BRIEF DESCRIPTION OF THE DRAWINGS

FIG. 1 is a block diagram of a system for processing a representation of an XML document under an illustrated embodiment of the invention;

FIG. 2 provides an example of an application that uses the Event Stream provided by the system of FIG. 1 in a pipeline processing model;

FIG. 3 is the tree representation of the information items in the sample XML document that may be processed by the system of FIG. 1;

FIG. 4 is a block diagram for the XML document to Event Stream converter program that may be used by the system of FIG. 1;

FIG. 5 is a flowchart for the processing of XML information items to create Event Stream within the XML document to Event Stream converter program of the system of FIG. 1;

FIG. 6 illustrates the organization of Event Stream sequence of bytes used by the system of FIG. 1;

FIG. 7 is a block diagram for the Event Stream Replay Processor program that may be used in conjunction with the system of FIG. 1;

FIG. 8 depicts valid character ranges for a utf-8 characters that may be processed by the system of FIG. 1;

FIG. 9 depicts traditional processing of utf-8 characters;

FIG. 10 depicts a lexical analyzer example under an illustrated embodiment of the invention and FIG. 11 depicts another example of a lexical analyzer example under an illustrated embodiment of the invention.

DETAILED DESCRIPTION OF AN ILLUSTRATED EMBODIMENT

FIG. 1 depicts a system 10 for creating an Event Stream 24 from a representation of an XML document, shown generally, under an illustrated embodiment of the invention. As used herein, a representation of an XML document may be a conventional XML document formatted as described by the World Wide Web Consortium (W3C) document Extensible Markup Language (XML) 1.0. The representation of the XML document may also be a Document Object Model of the XML document or a conversion of the XML document using an application programming interface (API) (e.g., using the "Simple API for XML" (SAX)).

An Event Stream consists of a sequence of opcodes and information items that contain the information items in a conventional XML Document. Unlike a conventional XML Document the information items in an Event Stream are encoded in a manner that can be efficiently processed using a common XML processing API (Application Programming Interface).

As shown in FIG. 1, the system 10 receives a representation of an XML document from a source 12 and provides the Event Stream 24 to a destination. Within the system 10, a parser 14 may first divide the representation into a series of information elements. A relationship processor 16 may determine a relationship among the elements. Once the relationship is determined, a operational code (opcode) processor 18 may append an opcode to the information and an assembly processor 20 may assemble the opcodes and information into the Event Stream 24.

In a sense, the Event Stream is an intermediate representation that can be easily converted to and from conventional XML representations. The Event Stream contains an Index Table and a Namespace Table which makes it possible to select and process subsections of an XML Document in a more efficient manner. The Event Stream representation (e.g., Index Table, Namespace Table, etc.) does not depend on memory address and thus can be moved from one process to another process whether on the same processor or another processor without change.

The Event Stream solves several problems related to pipeline processing of XML Documents. First, as XML processing becomes more extensive, it becomes more common to have the result from one processor be the input to another processor. Converting the result from one processor to a conventional XML Document and back to some other representation of an object model in another processor sometimes requires a substantial amount of time compared to the actual processing.

Another problem solved by the Event Stream is that digital signature processing often operates on a subset of an XML document. The Index Table, in conjunction with the Namespace Table, allows a subset of an XML Document to be selected in one phase of processing and the digital signature over that section of the XML document to be computed in another phase of processing. This provides a clean separation between the two parts.

Another problem solved by the Event Stream is that when an XML Document includes key information as part of the document it is convenient to remove the key information after decryption so as to present the payload, by itself, to the next stage of processing. The Index Table allows the key information to be identified during the decryption phase and then reused to exclude the key information during subsequent processing without the need to create an entirely new XML document.

Another problem solved by the Event Stream is that when an XML document is in the form of a World Wide Web Consortium SOAP Message (Simple Object Access Protocol), it is convenient to extract the message body from the message envelope for further processing. The Index Table, in conjunction with the Namespace Table, allows the message body to be selected for processing without construction of a new XML document.

Another problem solved by the Event Stream relates to output formats. An XSLT processor can generates an XML result, but this is only one of several output formats supported by XSLT processors. By adding extra instructions to the Event Stream, the XSLT processor can defer the output formatting to a later stage while still supporting all the special requirements of XSLT output formatting. If the consumer of the result has no need for a conventional XML Document then unnecessary conversion and formatting has been avoided. If the consumer of the result needs a conventional XML Document, then all the formatting information specified by the XSLT stylesheet is available in the Event Stream.

Another problem solved by the Event Stream relates to the divisibility of XML documents. In some cases multiple computing systems are connected together to form a pipeline. The format of the Event Stream does not depend on its memory address, so it is suitable for transmitting intermediate XML results from one computing system to another.

FIG. 2 illustrates the use of the Event Stream in the context of an XML processing pipeline. FIG. 2, in fact, illustrates the processes of FIG. 1 in the environment of an XML processing pipeline.

It should be noted that each processing step described herein (or shown in the drawings) is associated with a subroutine (i.e., a physical processing element and processor) that accomplishes that step. Accordingly, each processing step described herein has a corresponding processor adapted to accomplish that step.

The pipeline matches a processing model used for Web Services Security. In this scenario, a SOAP (Simple Object Access Protocol) Response message containing an XML document payload utilizing Web Services Security is received by an application. The response is processed to create a report and the report is formatted in Hypertext Markup Language (HTML) for presentation to a human being.

Generally, SOAP message with Web Services Security are processed in at least two steps.

In step 1 (Processor A 200) the information in the SOAP response is verified. This deals largely with the SOAP header and can include many steps. Among them may be the steps of checking that the entire message is a well-formed SOAP message conforming to Web Service Security schema, checking for altered message by computing the digest, checking that the digests cover all material that should be protected, fetching security certificates and verifying the signatures on the digests. This has little to do with the application which is concerned with the payload in the SOAP body, which may be significantly smaller than the SOAP header.

Application specific processing takes place in step 2 (Processor B 300) using the SOAP body. A pipeline is a natural way to handle this and insulates the application from changes in security and protocols. For instance, SOAP 1.2 is not backward compatible with SOAP 1.1, and there already exists other protocols for sending XML Documents to applications.

The Index Table, in conjunction with the Namespace Table, provides a way to create a new, virtual, XML Document from an existing document without altering the existing Event Stream. This is accomplished by presenting for processing those parts of the Event Stream that have been selected via the Index Table in step 1 (Processor A 200). In cases such as a SOAP body, the Namespace Table provides all the extra information needed to automatically create a well-formed, virtual, XML Document from the payload by itself. The application processor need not be aware of the previous processing steps. This makes it unnecessary to create a new, conventional, XML Document from the payload and avoids burdening the application processor (Processor B 300) with the parsing of a conventional XML document for input.

The output of the application processor (Processor B 300) may be another XML Document. The application processor may not know whether its results are destined for another processing step or the nature of that other processing step. The result of the application processing is another XML Document. As before, the formatting of the result as a conventional XML document and the parsing of this conventional document is avoided by using the Event Stream format that is designed to be an efficient way to exchange XML Documents.

The next step in the example is the XSLT processor 400. The XSLT processor applies an XSLT stylesheet to the XML Document to create a Hypertext Markup Language (HTML) document for use by a browser. The XSLT processor does not know the next processing step, but because of the instructions in the stylesheet it adds Event Stream instructions for output method ("html"), media-type ("text/html") and the preferred output encoding ("iso-8859-1"). An Event Stream instruction like "output encoding" does not affect character encoding of the Event Stream, which is always utf-8 (as defined by the Unicode Consortium), but it does affect the behavior of the formatter which knows how to handle this XSLT instruction.

In the final step, the XSLT Formatter 500 accepts the Event Stream and converts it to HTML with iso-8859-1 encoding. The browser of a user is now able to display the results of the user's query as an HTML document.

Event Stream construction may be considered next. The meaning and role of each item of a conventional XML Document is described by the World Wide Web Consortium XML specification. Except for the meta-data of the Document Type Declaration ("DTD"), all XML information items of the Event Stream may be represented by opcodes and information items in the Event Stream.

Shown below is a conventional XML Document that contains an example of each XML information item that may be represented in an Event Stream:

TABLE 1

Example XML Document

```
<?xml version="1.0" ?>
<!-- Employee Record -->
<?printer-font courier?>
<hr:employee xmlns:hr="acme.com/hr">
    <name xmlns="" first="John" last="Smith" />
    <salutation><![CDATA[Mr. John Smith]]></salutation>
</hr:employee>
```

The relationship of the parts of Table 1 is more clearly expressed as a tree structured representation of information items in FIG. 3.

FIG. 4 is a block diagram of the program structure used to convert a conventional XML document to a representation of an Event Stream sequence of bytes. It consists of XML Parser 100 that recognizes all the information items of an XML document and provides them as input to the Process Information Items 200 processor. The Process Information Items 200 processor may be thought of as providing the functionality of blocks 16 and 18 of FIG. 1. The details of the Process Information Items 200 process are further illustrated as a flow chart in FIG. 5. Similar algorithms could be used for converting other representations of XML document such as Document Object Model (DOM) to an Event Stream.

In the flow chart in FIG. 5, the square boxes represent routines that generate opcodes and information items which are appended to the sequence of bytes.

There is a close correspondence between each part of a conventional XML Document and the opcodes and information items present in an Event Stream. Table 2 illustrates the mapping of the information items found in the sample XML document presented in Table 1 to a description of the Event Stream opcodes.

TABLE 2

Mapping of XML document information items to Event Stream opcodes

| Conventional XML Document | Event Stream Opcode Description |
|---|---|
| <?xml version="1.0" . . . /> | Version 1.0 |
| <some-element . . . | Start Element |
| . . . some-attr="attr-value" . . . | Attribute |
| . . . xmlns="default-namespace-uri" . . . | Start Default Namespace |
| . . . xmlns:prefix="some-namespace-uri" | Start Namespace |
| <?printer-font courier ?> | Processing Instruction |
| <!---A comment --> | Comment |
| Mr. John Smith | Character Data |
| <![CDATA[Mr. & Mrs. John Smith]]> | CDATA Section |
| . . . </some-element> | End Element |
| <some-element/> | Start Element + End Element |

In a conventional XML Document there is no lexical construct to indicate the end of the scope of a Namespace Declaration. The scope of a Namespace Declaration ends with the XML Element in which it was declared. The Event Stream makes this explicit by adding an End Namespace opcode that delimits the scope of a Namespace Declaration.

The Start Element and End Element delimit the children of the XML Element, but the scope of a Namespace Declaration is delimited by a Start Namespace (or Start Default Namespace) and an End Namespace.

The scope of a namespace may be considered next. The scope of a Namespace Declaration starts with the XML Element with which it is associated and extends to the end of that same XML Element, including all children of that XML Element. A Namespace Declaration or Namespace prefix is said to be active with respect to some point if that point lies within the scope of that Namespace Declaration.

A Namespace Declaration or Namespace prefix is said to be visible at some point, if the point lies within the scope of the Namespace Declaration and there are no other active Namespace Declarations in the scope of the first Namespace Declaration with the same prefix. In this case the first Namespace Declaration is said to be hidden while the second Namespace Declaration is said to hide the first Namespace Declaration. When a later Namespace Declaration hides an earlier Namespace Declaration, the earlier Namespace Declaration becomes visible when the later Namespace Declaration goes out of scope and becomes inactive.

A Namespace Number may be considered next. In the Event Stream representation of an XML document, a Namespace Number replaces the constant repetition of a Namespace prefix in an XML Document with a short integer.

Namespace Numbers are generally assigned in ascending order starting with 2. Namespace #0 always represents "no namespace" for XML Elements and XML Attributes which have no associated Namespace. Namespace #1 always represents the "xml" Namespace with uniform resource identifier "http://www.w3.org/XML/1998/namespace". Both Namespace Numbers 0 and 1 are implicitly defined and do not appear as Start Namespace or Start Default Namespace opcodes in the Event Stream.

The largest Namespace Number is 255 due to the choice of an 8-bit integer to represent Namespace Numbers. The use of an 8 bit number is not intrinsic to the algorithm: a 16 bit integer might have been used allowing Namespace Numbers as large as 65,535.

A new Namespace Number is assigned for each XML Namespace Declaration. Even if it should happen that an XML Namespace Declaration appears later with the same prefix and same uniform resource identifier, a new Namespace Number is assigned. This is necessary as the two XML Namespace Declarations will have different scopes.

There are two cases of XML Namespace Declaration represented in the following fragment from a conventional XML Document:

. . . xmlns:some-prefix="uri-associated-with-prefix" . . .
. . . xmlns="default-prefix-uri" . . .

The first case shown above causes a Start Namespace opcode and information items to be formed using a newly assigned Namespace Number, the prefix some-prefix, and the uri uri-associated-with-prefix. This is appended to the sequence of bytes. This new definition of the namespace prefix hides any previous definition of some-prefix for the entire scope of the new Namespace Declaration. The newly assigned Namespace Number is used with all XML Elements and XML Attributes that have the prefix some-prefix while the Namespace Declaration is visible.

The second case shown above has no prefix because it defines a default namespace. It causes a Start Default Namespace opcode and information items to be formed using the newly assigned Namespace Number and the uri default-prefix-uri. This is appended to the sequence of bytes.

This new definition of the default namespace hides the previous definition of the default namespace for the entire scope of the new Namespace Declaration. Initially, the default namespace is "no namespace" which is represented by Namespace #0. The newly assigned default Namespace Number is used with all XML Elements which have no prefix while the Namespace Declaration is visible. It is not used with XML Attributes that lack a prefix.

In the Event Stream, the Start Namespace opcode and information items and the Start Default Namespace opcode and information items appear before the opcode and information items that represent the XML Element which contains them in a conventional XML Document. This is appropriate because the scope of an xmlns includes the element that precedes the xmlns. Thus in the following XML fragment:

<hr:employee xmlns:hr="acme.com/hr"> . . . </hr:employee>

The prefix hr in hr:employee is well defined since it is in the scope of the xmlns:hr attribute, even though it precedes it lexically.

A Prefix Map and an Open Items Stack may be considered next. The XML document to Event Stream converter uses Prefix Map 300 and Open Items Stack 600 data structures (in FIG. 4) during the processing of information items to keep track of the scope of the namespaces and to facilitate the generation of Start and End Namespace opcodes and associated information items.

The Prefix Map 300 (FIG. 4) data structure gives the Namespace Number currently associated with a given prefix. An empty string represents "no prefix" for Default Namespace Declarations in the Prefix Map. The Prefix Map allows the previous association between prefix and Namespace Number to be restored when the current Namespace Declaration goes out of scope. The Prefix Map is a map of Prefix Map Entries. The key for the map is the prefix string or an empty string for Default Namespace Declarations. A Prefix Map Entry may contain the following information items: the prefix string, the Namespace Number associated with the prefix string and a previous link which is either null or points to a previously defined Prefix Map Entry.

The Open Items Stack 600 (FIG. 4) data structure contains a stack of all active Namespace Declarations and open elements during the processing of information items. It is not part of the Event Stream; it only exists during the construction of the Event Stream. This data structure is used to trigger the construction of End Namespace opcode and information items. When a new element is encountered, prefixes and other information of the namespace declarations associated with that element are pushed into the Open Items Stack followed by the name of the element itself. When an end element is recognized, the element name on top of the stack is popped and End Namespace opcodes are generated for any namespaces that have been pushed into the stack for that element.

The Process start document 100 (FIG. 5) information processor is triggered at the start of a new XML document. In this case, when a Start Document opcode is formed, the Prefix Map is initially populated with the following Prefix Map entries: a Prefix Map Entry with an empty string and 0 to indicate that "no namespace" is assigned to Namespace Number 0 and a Prefix Map Entry with the string "xml" and 1 to indicate that the "xml" namespace is assigned to Namespace Number 1.

The Process namespace 1400 (FIG. 5) processor is triggered when a namespace information item with an explicit prefix is encountered. In this case, a new Prefix Map Entry is constructed with the prefix string, the newly assigned Namespace number, and the value null for the previous link.

The Process default namespace 1500 (FIG. 5) process is triggered when a namespace information item with no prefix is encountered. In this case, a new Prefix Map Entry is constructed with an empty prefix string, the newly assigned Namespace number, and the value null for the previous link.

If the prefix is not already present in the Prefix Map then the new Prefix Map Entry is inserted using the prefix string as the key.

If the prefix is present in the Prefix Map then a pointer to the existing Prefix Map Entry replaces the previous link in the new Prefix Table Entry. The new Prefix Map Entry then replaces the existing Prefix Map Entry in the map. This effectively hides the existing definition of the prefix with the new definition.

The prefix is then pushed onto the Open Items Stack 600 (FIG. 3).

The Process end of element 900 (FIG. 5) processor is triggered at the end of an element. The Process end of empty element 1700 (FIG. 5) processor is triggered at the end of an empty element. In this case, End Namespace opcode and information item are formed and the corresponding entry in the Prefix Map table deleted for each namespace entry popped from the top of the Open Items Stack 600 (FIG. 4). The prefix associated with the End Namespace opcode is found in the namespace entry popped from the Open Items Stack. The prefix so obtained is also used to search the Prefix Map for a matching Prefix Map Entry. The previous link from this Prefix Map is used to locate the previously visible Prefix Map Entry.

If the previous link is null, then there was no previous Namespace Declaration with the same prefix. The existing Prefix Map Entry is removed from the map. This makes the prefix which has gone out of scope inactive.

If the previous link is not null then the previously visible Prefix Map Entry identified by the previous link replaces the one which is in the map. This makes the prefix which has gone out of scope inactive and the previously hidden prefix visible.

Attributes may be considered next. The Process attribute 1300 (FIG. 5) process, triggered for each attribute within an element, prepares the namespace number, attribute's local name and value to be output with the Attribute opcode.

If an XML Attribute has a prefix it is looked up in the Prefix Map to find the corresponding Namespace Number. This Namespace Number, the XML Attribute's local name, and the XML Attribute's value are formed into an opcode and information items and appended to the sequence of bytes.

If an XML Attribute has no prefix then Namespace #0, the XML Attribute's local name, and the XML Attribute's value are formed into an opcode and information items and appended to the sequence of bytes. This processing does not apply to the xmlns Attribute. An xmlns Attribute is always interpreted as an XML Namespace Declaration and can only appear in a conventional XML Document.

Information elements may be considered next. The Process start element 200 triggered at the start of an element saves the element name to be output with the Start Element opcode and waits for attribute and namespace information items associated with the element before the element is closed or ended. The Start Element opcode is output when the element is closed or ended as an empty element.

The end of an XML Element can be expressed in two ways in a conventional XML Document:
<name xmlns="" first="John" last="Smith"/>
<name xmlns="" first="John" last="Smith"></name>

The first of these is called an empty element. Regardless of the form used in a conventional document, both forms cause both a Start Element and an End Element opcode and information items to be appended to the sequence of bytes.

The Process close of element 1600 triggered at the close of an element and Process end of empty element 1700 triggered at the end of an empty element, prepares the namespace number and the element's local name to be output with the Start Element opcode.

If an XML Element has a prefix, then it is looked up in the Prefix Map to find the corresponding Namespace Number. This Namespace Number from the Prefix Map Entry and the XML Element's local name are formed into an opcode and information items and appended to the sequence of bytes.

If an XML Element has no prefix then the Namespace Number associated with the default namespace is looked up in the Prefix Map using an empty string as the key. This Namespace Number and the XML Element's local name are formed into an opcode and information items and appended to the sequence of bytes.

The Process end of element 900 (FIG. 5) process triggered at the end of an element and Process end of empty element 1700 (FIG. 5) process triggered at the end of an empty element, output the End Element opcode.

The CDATA Section and Character Data provisions will be discussed next. CDATA Sections and Character Data are simply two different way of adding character data to an XML Document using different mechanisms to escape special characters, such as ampersand ("&"). The CDATA Section opcode exists for two reasons. First, it is pleasing to be able to convert a conventional XML Document which includes a CDATA Section to an Event Stream, format the Event Stream as a conventional XML Document, and to see a CDATA Section in the result Document where the original Document had a CDATA Sections. Second, an XSLT processor can create an XML Document as an Event Stream rather than as a conventional XML Document with the intent that the Event Stream will later be formatted as a conventional XML Document. The instructions for processing an XSLT stylesheet and input document can specify that portions of the output should be formatted as a CDATA Section. Using a special opcode for this purpose allows this instruction to be encoded in the Event Stream.

The Process CDATA section 600 (FIG. 5) processor, triggered when CDATA information items are encountered, prepares the data value to be output with the CDATA opcode.

If a CDATA section is adjacent to character data, then they are merged into a single CDATA Section. If this results in two or more CDATA sections that are adjacent, then they are all merged into a single CDATA Section opcode and information item. This is required by the XML specification.

According to the XML specification, the only character data that can appear before the start of the root element or after the end of the root element is white space (tab character, carriage return, linefeed, and space character). According to the XML specification, such white space should always be discarded.

Processing instructions may be considered next. A processing instruction consists of two parts: a target following the opening "<?" and data separated from the target by one or more white space characters and ending with the closing "?>". A target is not a qualified name and cannot have a Namespace prefix. Therefore there is no need to specify a Namespace Number for a processing instruction opcode and information item in the Event Stream.

The Process processing instructions 500 (FIG. 5) processor is triggered when processing instructions information items are encountered. This processor prepares the target and data values to be output and adds the Processing Instructions opcode.

The processing of comments may be considered next. A comment consists of data between the opening "!--" and the closing "-->" The "<!--" and "-->" are not represented in the Event Stream.

The Process comments 400 (FIG. 5) processor is triggered when comment information items are encountered. This processor prepares the data value to be output and adds the Comment opcode.

The Start Document and End Document elements may be considered next. The Start Document and End Document opcodes of the Event Stream are simply a convenient mechanism to indicate the start and end of the sequence of bytes so as to allow for initialization and finalization using the mechanism of opcode and information items which is already available. There are no other information items associated with these opcodes. When the Start Document opcode is formed the "well-formed" field of the header of the Event Stream is set to zero. When the End Document opcode is formed, the "well-formed" field of the header of the Event Stream is set to 1 if there have been no errors.

The Process start document 100 (FIG. 5) processor is triggered at the start of an XML document. This processor creates the Event Stream header, initializes the data structures used for processing information items in the XML document and adds the Start Document opcode. The following steps are performed by this process. First, the Event Stream header is created and output. Next, the Event Stream header fields containing the header version and the header length are set to their proper values and the rest of the fields are set to an initial value of zero so that they could be filled by more appropriate values by the Process end document 800 (FIG. 5) process. Next, the Start Document opcode is output. Next, the Namespace Table 500 (FIG. 4) data structure is initialized. Next, The Open Items Stack 600 (FIG. 4) data structure is initialized. Next, the Index Table 700 (FIG. 4) data structure is initialized. Finally, the Prefix Map 300 (FIG. 4) data structure is initialized and two Prefix Map entries are added. The first of the two Prefix Map entries is the Prefix Map Entry for Namespace Number 0 ("no namespace"). The second is the Prefix Map Entry for Namespace Number 1 ("xml" namespace).

The Process end document 800 (FIG. 5) processor is triggered at the end of an XML document. This processor appends the contents of Namespace Table 500 (FIG. 4) and the contents of Index Table 700 (FIG. 4) to the Event Stream sequence of bytes, outputs the End Document opcode and fills the final values in the Event Stream header fields. The following steps are performed by this process. First, the contents of Namespace Table 500 (FIG. 4) are appended to the sequence of bytes. The offset of the Namespace Table 500 from the header is determined and the offset and length of the Namespace Table are filled in the corresponding Event Stream header fields. Next, the contents of Index Table 700 (FIG. 4) are appended to the sequence of bytes, and its offset and length are filled in the corresponding Event Stream header fields. Next, the End Document opcode is appended to the sequence of bytes. Next, the length of the Event Stream itself is filled in the corresponding Event Stream header field. Finally, the Well-Formed Event Stream header field value is set to 1.

The possibility of other XML versions is considered next. At the moment, there is only a single version of the XML specification: version 1.0. The version information is represented in the Event Stream by the "XML VERSION 1.0" opcode. There are no other information items associated with the opcode.

The Process xml instructions 300 (FIG. 5) processor is triggered when XML Declaration information items are encountered. This processor outputs the XML Version 1.0 opcode.

A summary of operational codes (opcodes) may be considered next. Table 3 summarizes the opcodes and the associated information items used in the Event Stream. Other, additional opcodes may be added to further expand the functionality of the Event Stream, hence the gap in the list of opcodes shown in Table 3. Table 4 summarizes the format of each type of information item that can be used with an opcode.

TABLE 3

Event Stream opcodes and information items

| Information Item Description Component Description | Opcode | Information Items |
|---|---|---|
| Start of Document | 2 | None |
| End of Document | 3 | None |
| XML Declaration | | |
|   Contains version="1.0" | 1 | None |
|   Encoding Option | | Not Represented. |
|   Standalone Option | | Not Represented. |
| Start Element | 7 | |
|   Element Namespace Number | | Namespace Number |
|   Element Local Name | | String |
| End Element | 8 | None |
| Attribute | 9 | |
|   Attribute Namespace Number | | Namespace Number |
|   Attribute Local Name | | String |
|   Attribute Value | | String |
| Start Namespace Declaration | 4 | |
|   Namespace Number | | Namespace Number |
|   Namespace Prefix | | String |
|   Namespace URI | | String |
| Start Default Namespace Declaration | 5 | |
|   Namespace Number | | Namespace Number |
|   Namespace URI | | String |
| End Namespace Declaration | 6 | |
|   Namespace Number | | Namespace Number |
| Processing Instruction | 12 | |
|   Target | | String |
|   Data | | String |
| Comment | 13 | |
|   Data | | String |
| Character Data | 10 | |
|   Data | | String |
| CDATA Section | 11 | |
|   Data | | String |
| Document Type Declaration | | |
|   Name | | Not represented. |
|   System Literal | | Not represented. |
|   Public Literal | | Not represented. |
|   Element Declaration | | Not represented. |
|   Attribute List Declaration | | Not represented. |
|   General Entity Declaration | | Not represented. |
|   Parameter Entity Declaration | | Not represented. |
|   Notation Declaration | | Not represented. |
| XSLT Related | | |
|   Output Method | 17 | String |
|   Output Encoding | 18 | String |
|   Output XML Declaration | 19 | 0 or 1 (one byte integer) |

TABLE 3-continued

Event Stream opcodes and information items

| Information Item Description Component Description | Opcode | Information Items |
|---|---|---|
|   Output XML "standalone" value | 20 | 0 or 1 (one byte integer) |
|   PUBLIC Literal Value | 21 | String |
|   SYSTEM Literal | 22 | String |
|   Indent Output | 23 | 0 or 1 (one byte integer) |
|   Media Type Value | 24 | String |
|   End of Output Options | 25 | None |
|   Disable Output Escaping UP | 26 | None |
|   Disable Output Escaping DOWN | 27 | None |
| No-Operation (No information items) | 29 | None |
| No-Operation (1 byte) | 30 | Skips 1 byte |
| No-Operation (String information item) | 31 | Skips a String |

The No-Operation opcodes are used when combining two sequences of bytes. If a second Event Stream is to be embedded in the first sequence there would be opcodes in the second event stream which appear where they are no longer appropriate. In particular, the Start Document and all the opcodes related to XSLT formatting would now appear after the start of the root element, when they should normally appear before the start of the root element and may contradict options selected by the first document. When the byte sequences are combined, such inappropriate opcodes are replaced with a No-Operation opcode that has similar information items. Thus, a Media Type Value opcode which has a String information item would be replaced with opcode 31, a No-Operation that skips a String information item. An Indent Output opcode which has a 1-byte integer information item would be replaced with opcode 30, a No-Operation opcode that skips a 1-byte operand.

For each of the items mentioned above, there is a specific method of representing it in the Event Stream. The representation of each item starts with the opcode, a single byte containing a small integer, which is used by the destination to interpret the bytes which follow.

The information items that follow the opcode are of three kinds as described by the table below (Table 4 Item types within Event Stream information items):

TABLE 4

Item types within Event Stream information items

| Item Type | Description |
|---|---|
| 1 byte integer | For values between 0 and 255. Also used for boolean values (false=0, true=1) |
| String | |
| String length | Strings must be between 0 and $2^{24} - 1$ bytes in length. The length is the number of bytes, not the number of Unicode characters. A Unicode character encoded using utf-8 may be one, two, three, or four bytes long. Since the length is less than $2^{24} - 1$ it can be expressed using 24 bits, which requires three bytes. The three bytes are written to the sequence of bytes starting with the most significant byte, then the middle byte, and finally the least significant byte. The string length is the length of the utf-8 byte sequence and includes neither the three-byte length field itself nor the zero byte which is appended to the utf-8 byte sequence. A valid utf-8 byte sequence does not contain bytes with the value zero. |

TABLE 4-continued

Item types within Event Stream information items

| Item Type | Description |
|---|---|
| Utf-8 byte sequence | The data part of a String. This is always a utf-8 encoded Unicode string. |
| Zero byte | Appended to the sequence of bytes following the utf-8 encoded byte sequence. |
| Namespace Number | A one-byte integer with a value between 0 and 255. Each Namespace Number is associated with an XML Namespace Declaration prefix and uniform resource identifier. The XML Namespace Declaration causes the formation of either a Start Namespace or Start Default Namespace opcode and information items. There are two special cases: A value of 0 for a Namespace Number is always used with XML Element names and XML Attribute names which are not in any namespace. A value of 1 for a Namespace Number is always used with XML Element names and XML Attribute names which have the prefix "xml". The meaning of the prefix "xml" has been predetermined by the World Wide Web Consortium and is not allowed to be changed. |

An Event Stream for the example document will be provided next. The opcodes and the associated information items for the example XML Document in Table 1 are given in the following table (Table 5 Event Stream opcodes and information items for sample XML document) in the same order they would appear in the Event Stream sequence of bytes representation.

TABLE 5

Event Stream opcodes and information items for the sample XML

| Opcode and Information Item | Associated XML Fragment |
|---|---|
| Start Document | |
| XML Version | <?xml version="1.0" . . . |
| Comment | <!-- Employee Record --> |
| Processing Instruction | <?printer-font courier?> |
| Start Namespace namespace number is 2 prefix is "hr" uri is "acme.com" | xmlns:hr="acme.com/hr" |
| Start Element namespace number is 2 ("hr") local name is "employee" | <hr:employee . . . |
| Character Data | newline and 4 spaces |
| Start Default Namespace namespace number is 3 uri is the empty string | xmlns="" |
| Attribute Namespace number is 0 local name is "first" value is "John" | first="John" |
| Attribute Namespace number is 0 local name is "last" value is "Smith" | last="Smith" |
| Start Element namespace number is 3 local name is "name" | <name . . . |
| End Element | . . . /> |
| End Default Namespace namespace number is 3 | . . . /> |
| Character Data | newline and 4 spaces |
| Start Element | <salutation . . . |
| CDATA Section | John Smith |
| End Element | </salutation> |
| Character Data | Newline |
| End Element | </hr:employee> |

TABLE 5-continued

Event Stream opcodes and information items for the sample XML

| Opcode and Information Item | Associated XML Fragment |
|---|---|
| End Namespace namespace number is 2 | </hr:employee> |
| End Document | |

For simplicity, the following fields in the Event Stream header are not shown. First, Identification string ("XMLEVSTR") is not shown. This allows routines to distinguish an Event Stream from other data structures when necessary.

The Field which identifies the version of the header itself is not shown.

The Field containing the length (in bytes) of the header is not shown. This is used to locate the Start of Document opcode.

The Field containing the length (in bytes) of the Event Stream is not shown. This is used when the Event Stream needs to be copied or transmitted.

The Field containing the offset (in bytes) to the Index Table is not shown. If the Index Table is empty this is zero.

The Field containing the size (in bytes) of the Index Table is not shown. If the Index Table is empty this is zero.

The Field containing the offset (in bytes) to the Namespace Table is not shown. This is used to locate the Namespace Table. If the Namespace Table is empty this is zero.

The Field containing the size (in bytes) of the Namespace Table is not shown. If the Namespace Table is empty this is zero.

The Field containing a well-formed boolean flag is not shown. This field is initialized to 0 when the header of the Event Stream is first created. If there are no problems constructing the sequence of bytes and the processor completes the sequence of bytes by forming an End Document opcode, then the field is set to 1 to indicate that the Event Stream is well-formed.

Shown below is an example sequence of information elements of an Event Stream that has been interspersed with explanatory information. The XML information elements are the lines that contain numbers exclusively and are indented below the element's description. Below each byte of each line of the information element is an explanation of the byte's meaning.

Stated differently, each opcode is preceded by the opcode name (e.g. Start Element) and a description of its information items if any (e.g. For Start Element it is "namespace number, local name"). In the line below the opcode description, the opcode and information item(s) are shown broken down into bytes. The value of each byte is shown in decimal. Below each byte is a human-readable form of annotation. If it is a single letter than this is the character value of the contents of the byte (e.g. 65 is the letter "A"). If the annotation is more than one letter than it is an abbreviation. The abbreviations are as follows: OPC=Opcode, EOS=End of string, NS#=Name space number, sp=space character and nl=newline character.

```
Start Document
    2
    OPC
Version 1.0
    1
    OPC
Comment (data)
    13    0    0    17   32   69   109  112  108  111  121  101  101  32
    OPC   strlen=17  sp   E    m    p    l    o    y    e    e    sp
          82   101  99   111  114  100  32   0
          R    e    c    o    r    d    sp   EOS
Processing Instruction (target, data)
    12    0    0    12   112  114  105  110  116  101  114  45   102  111  110  116  0
    OPC   strlen=12  p    r    i    n    t    e    r    -    f    o    n    t    EOS
          0    0    7    99   111  117  114  105  101  114  0
          strlen=7   c    o    u    r    i    e    r    EOS
Start Namesapce (Namespace Number, prefix, uniform resource identifier)
    4     2    0    0    2    104  114  0
    OPC   NS#2 strlen=2   h    r    EOS
                0    0    11   97   99   109  101  46   99   111  109  47   104  114  0
                strlen=11  a    c    m    e    .    c    o    m    /    h    r    EOS
Start Element (Namespace Number, local name)
    7     2    0    0    8    101  109  112  108  111  121  101  101  0
    OPC   NS#2 strlen=8   e    m    p    l    o    y    e    e    EOS
Character Data (data)
    10    0    0    5    10   32   32   32   32   0
    OPC   strlen=5   nl   sp   sp   sp   sp   EOS
Start Default Namespace (Namespace Number, uniform resource identifier)
    5     3    0    0    0    0
    OPC   NS#3 strlen=0   EOS
Attribute (Namespace Number, name, value)
    9     0    0    0    5    102  105  114  115  116  0
    OPC   NS#0 strlen=5   f    i    r    s    t    EOS
                0    0    4    74   111  104  110  0
                strlen=4   J    o    h    n    EOS
Attribute (Namespace Number, name, value)
    9     0    0    0    4    108  97   115  116  0
    OPC   NS#0 strlen=4   l    a    s    t    EOS
                0    0    5    83   109  105  116  104  0
                strlen=5   S    m    i    t    h    EOS
Start Element (Namespace Number, local name)
    7     0    0    0    4    110  97   109  101  0
    OPC   NS#0 strlen=4   n    a    m    e    EOS
End Element
    8
    OPC
End Namespace (Namespace Number)
    6     3
    OPC   NS#3
Character Data (data)
    10    0    0    5    10   32   32   32   32   0
    OPC   strlem=5   nl   sp   sp   sp   sp   EOS
Start Element (Namespace Number, local name)
    7     0    0    0    10   115  97   108  117  116  97   116  105  111  110  0
    OPC   NS#0 strlen=10  s    a    l    u    t    a    t    i    o    n    EOS
CDATA Section (data)
    11    0    0    14   77   114  46   32   74   111  104  110  32   83   109  105  116  104  0
    OPC   strlen=14  M    r    .    sp   J    o    h    n    sp   S    m    i    t    h    EOS
End Element
    8
    OPC
Character Data (data)
    10    0    0    1    10   0
    OPC   strlen=1   nl   EOS
End Element
    8
    OPC
End Namespace (Namespace Number)
    6     2
    OPC   NS#2
End Document
    3
    OPC
```

The Namespace Table may be considered next. The Namespace Table 500 (FIG. 4) data structure has one Namespace Table Entry for each Namespace Declaration appearing in the representation of an XML Document. A Namespace Table Entry contains two information items. The first item is the offset, in bytes, from the start of the Event Stream to the corresponding Start Namespace or Start Default Namespace opcode. This offset is a 32 bit integer and does not depend on the memory address of the Event Stream.

The second item in the Namespace Table Entry is the offset, in bytes, from the start of the Event Stream to the corresponding End Namespace opcode. This offset is a 32 bit integer and does not depend on the memory address of the Event Stream. Because header fields precede the first opcode, the values of these offsets can never be zero.

The Namespace Table is constructed in a separate area of memory from the sequence of bytes so that it can grow in size during construction of the sequence of bytes without any change to the sequence of bytes previously written.

Whenever a Start Namespace or Start Default Namespace operation is constructed in the Process namespace 1400 (FIG. 5) processor or in the Process default namespace 1500 (FIG. 5) processor, a number of things happen. First, the offset of the opcode is determined by a Namespace Table offset processor and placed in the appropriate field of the next available Namespace Table Entry in the Namespace Table and a counter is incremented. The value 1 is added to this counter to create the Namespace Number corresponding to this XML Namespace Declaration. The Namespace Number appears in some information items formed in the sequence of bytes. An addition, the address of the Namespace Table Entry along with namespace prefix is pushed into the Open Items Stack 600 (FIG. 4).

Whenever an End Namespace operation is constructed in the Process end of element 900 (FIG. 5) processor or in the Process end of empty element 1700 (FIG. 5) processor, a number of other things happen. First, the address of the Namespace Table Entry of the matching Start Namespace or Start Default Namespace is obtained by popping the most recent item from the Open Items Stack. Next, the offset of the End Namespace opcode is stored in the appropriate field of the Namespace Table Entry whose address was popped from the top of the Open Items Stack.

When an End Document operation is formed and appended to the sequence of bytes, then the Namespace Table (which was constructed in a separate area of memory) is appended to the sequence of bytes following the End Document opcode. The offset of the Namespace Table and the size of the Namespace Table are each filled into predetermined fields in the header of the Event Stream by a Namespace Table pointer processor so that they can be located by the destination 22 of the Event Stream. In a well-formed representation of an XML Document, there will be as many End Namespace opcodes as the total of Start Namespace and Start Default Namespace opcodes, so all fields in all Namespace Table Entries will be valid.

The Namespace Table Entries should be in ascending order by the offset of the Start Namespace offset or Start Default Namespace opcode offset in order to simplify the determination of active and visible Namespace Declarations given an offset for an opcode.

The reconstruction of visible namespace declarations will be considered next. Using the Namespace Table it is possible to determine all the Namespace Declaration which are visible and active for any opcode in the Event Stream without processing opcodes and information items which are unrelated to Namespace Declarations.

Normally, it is not possible to analyze a subsection of a conventional XML document without starting from the beginning because the definition of Namespaces preceding the subsection of interest can affect the interpretation of the document. In the following example, the Namespace prefix "division" changes meaning as a result of the xmlns Namespace Declaration. For the accounting department "division:group" describes an administrative group. For the training department "division:group" describes the level of training of a cohort of students rather than an administrative group.

```
<company xmlns="http://www.widget.com">
    <department name="accounting"
xmlns division="http://www.widget.com/accounting">
            <employee name="jones" division:group="audit" />
        </department>
        <department name="training"
            xmlns:division="http://www.widget.com/training">
        <employee name="smith" division:group="beginners" />
    </department>
</company>
```

For a given offset, an active Namespace Declaration is one which starts before the given offset and ends after the given offset so that the given offset is inside the scope of the Namespace Declaration. Also for a given offset, a visible Namespace Declaration is one which is active and which does not enclose another active Namespace Declaration with the same prefix.

A Namespace Table is composed of zero or more Namespace Table Entries. Given a Namespace Table Entry and an offset (with value OFFSET) to an opcode which is neither a Start Namespace, nor a Start Default Namespace, nor an End Namespace one of three cases applies. First, the Start Namespace field of the Namespace Table Entry is greater than OFFSET. In this case the Namespace Table is not active at that offset.

Second, the End Namespace field of the Namespace Table Entry is less than OFFSET. In this case the Namespace Table Entry is not active at that offset.

Third, the Start Namespace field of the Namespace Table Entry is less than OFFSET and the End Namespace field of the Namespace Table Entry is greater than offset. In this case the Namespace Table Entry is active at that offset. It may or may not be visible.

If the opcode is neither a Start Namespace, Start Default Namespace, nor End Namespace it can never be equal to an offset in a Namespace Table Entry since the Namespace Table records only offsets for Start Namespace, Start Default Name, and End Namespace.

The visible Namespace Declarations are determined by finding all active Namespace Declarations for the given offset in the Namespace Table and removing those which have the same prefix as those which are active but appear later in the Namespace Table. The prefix of the Namespace Declaration is not recorded in the Namespace Table Entry, but the Start Namespace Declaration or Start Default Namespace Declaration offset are present and can be used to locate the opcode which defines the Start Namespace or Start Default Namespace.

Given the location of the opcode, the prefix information item can be found and compared with the prefix of any other Namespace Declaration that is known to be active. Given two or more active Namespace Declarations with identical prefixes, the one which is visible is the one with the largest value for the Start Namespace or Start Default Namespace opcode. Recall that a Namespace Table constructed as described earlier will be in ascending order by the offset of the Start Namespace or Start Namespace Declaration opcode.

The use of the Namespace Table may be considered next. As an example of the use of the Namespace Table, suppose one wanted to select just the <salutation> element from the example XML document in Table 1 knowing that it appears in the Index Table with the identifier "select".

Further assume that one wants to replay it so that this element and its children appear to be a complete and valid XML Document to the processor at the destination.

In this discussion, we follow the C programming language convention of using the prefix "0x" to indicate a hexadecimal (base 16) number. Thus 0x14 is hexadecimal 14 or decimal 20.

Please refer to the dump of the Event Stream for this XML document below:

Header

| event stream address: | 0x000c000 |
|---|---|
| totalLength: | 268 |
| version: | 1 |
| headerLength: | 32 |
| offsetToData: | 32 |
| offsetToNamespaceTable: | 252 |
| offsetToIndexTable: | 272 |

Namespace Table

| ns | startOffset | endOffset | nst entry address |
|---|---|---|---|
| 2 | 0x54 (0x000c054) | 0xf1 (0x000c0f1) | 0x000c0fc |
| 3 | 0x83 (0x000c083) | 0xba (0x000c0ba) | 0x000c104 |

End Namespace Table

Index Table

| pos | identifier | offset | interp it | entry address |
|---|---|---|---|---|
| #1 | select | 0xc6 (0x000c0c6) | 2 | 0x000c110 |

End Index Table

```
0x000c020: #1    off=0x20    opcode= 2    (start document)
0x000c021: #2    off=0x21    opcode= 1    (version 1.0)
0x000c022: #3    off=0x22    opcode=13    (comment)
    " Employee Record " (len=17 address=0x000c026)
0x000c038: #4    off=0x38    opcode=12    (pi)
    "printer-font" (len=12 address=0x000c03c)
    "courier" (len=7 address=0x000c04c)
0x000c054: #5    off=0x54    opcode= 4    (start namespace)
    ns=2
    "hr" (len=2 address=0x000c059)
    "acme.com/hr" (len=11 address=0x000c05f)
0x000c06b: #6    off=0x6b    opcode= 7    (start element)
    ns=2
    "employee" (len=8 address=0x000c070)
```

-continued

```
0x000c079: #7    off=0x79    opcode=10    (char data)
    "\n        " (len=5 address=0x000c07d)
0x000c083: #8    off=0x83    opcode= 5    (start default namespace)
    ns=3
    "" (len=0 address=0x000c088)
0x000c089: #9    off=0x89    opcode= 9    (attribute)
    ns=0
    "first" (len=5 address=0x000c08e)
    "John" (len=4 address=0x000c097)
0x000c09c: #10   off=0x9c    opcode= 9    (attribute)
    ns=0
    "last" (len=4 address=0x000c0a1)
    "Smith" (len=5 address=0x000c0a9)
0x000c0af: #11   off=0xaf    opcode= 7    (start element)
    ns=0
    "name" (len=4 address=0x000c0b4)
0x000c0b9: #12   off=0xb9    opcode= 8    (end element)
    elem=name
0x000c0ba: #13   off=0xba    opcode= 6    (end namespace)
    ns=3
0x000c0bc: #14   off=0xbc    opcode=10    (char data)
    "\n        " (len=5 address=0x000c0c0)
0x000c0c6: #15   off=0xc6    opcode= 7    (start element)
    ns=0
    "salutation" (len=10 address=0x000c0cb)
0x000c0d6: #16   off=0xd6    opcode=11    (cdata section)
    "Mr. John Smith" (len=14 address=0x000c0da)
0x000c0e9: #17   off=0xe9    opcode= 8    (end element)
    elem=salutation
0x000c0ea: #18   off=0xea    opcode=10    (char data)
    "\n" (len=1 address=0x000c0ee)
0x000c0f0: #19   off=0xf0    opcode= 8    (end element)
    elem=employee
0x000c0f1: #20   off=0xf1    opcode= 6    (end namespace)
    ns=2
0x000c0f3: #21   off=0xf3    opcode= 3    (end document)
0x000c0f4:
```

Normal End of Document

Given an offset, to determine the address of some item, the offset is added to the Event Stream address. In this example, the address of the Event Stream is 0xc000.

The header indicates that the Index Table is at offset 272 (decimal) or address 0xc110. The first (and only) item in the Index Table has the identifier "select" and the corresponding offset is 0xc6. The Interpretation flag is 2, which indicates that all children of the element should be presented for processing. Offset 0xc6 is marked as opcode #15 in the figure and is the element <salutation>.

Since we want to process the XML Element and its children, it is necessary to determine the end of the XML Element. This is done by counting the nesting of XML Elements and Namespace Declarations. The counter is set to 0, initially. The counter is incremented for each Start Namespace, Start Default Namespace, or Start Element which appears in the byte sequence. The counter is not incremented for Start Namespace or Start Default Namespace operations created as a result of Namespace Table processing. Each End Namespace and End Element causes the counter to be decremented. Again, this does not include End Namespace operations which are created as a result of Namespace Table processing. When the counter reaches zero it has finished processing opcodes from the Event Stream.

FIG. 6 shows the organization of an Event Stream. The arrows and lines to the right and left are indicative of the locations or lengths of the components of the Event Stream.

FIG. 7 is a block diagram of a replay processor. The replay processor may be used by a user 22 as described in more detail below.

In order to replay the element as though it was a valid and complete XML Document, the namespace context must be reconstructed. Processing of the Namespace Table results in the presentation of Start Namespace and Start Default Namespace operations to the processor. In order to balance these with End Namespace operations, a stack is used to keep track of the Namespace Numbers presented to the processor during Namespace Table processing. When processing from the byte sequence is complete, the stack is used at the end to determine the Namespace Numbers that must be presented to the processor by End Namespace operations.

The first step in replay is to Present a "Start Document" event to the processor. According to the header, the Namespace Table is at offset 252 (0xfc). There are two Namespace Table Entries. The first, at address 0xc0fc is active from offset 0x54 to offset 0xf1, which includes <salutation> at offset 0xc6. At offset 0x54 is a Start Namespace opcode. This is marked as opcode #5. To determine whether the Namespace Declaration is visible at 0xc6 search forwards for any Namespace Table Entries which are active and have the same prefix ("hr").

There is only one other Namespace Table Entry, at offset 0x104, which is active from offset 0x83 to offset 0xba. The opcode at offset 0x83 is marked as opcode #8 and is a Start Default Namespace opcode. A Start Default Namespace opcode will never match the prefix of a Start Namespace, so the first Namespace Declaration for "hr" is not only active but also visible.

Had the opcode at offset 0x83 been Start Namespace, then the opcode and its information would have been decoded to determine the prefix. Had the prefix been "hr", then the Start Namespace opcode at 0x54 would have been ignored because the one at offset 0x83 would have hidden the one at offset 0x54.

The Namespace Declaration at offset 0x54 is presented to the processor because it is visible at offset 0xc6. For a conventional document this is equivalent to xmlns:hr="acme.com/hr". This is Namespace Number 2. Push the Namespace Number onto Replay Open Namespace Number Stack.

The next Namespace Table Entry is, as mentioned earlier, a Start Default Namespace opcode at offset 0x83. It is active because the start and end offsets include <salutation> at offset 0xc6. A search forwards in the Namespace Table finds no other Namespace Table Entries for Start Default Namespace opcodes because it was the last one. Therefore it is both active and visible.

The Namespace Declaration at offset 0x83 is presented to the processor because it is visible at offset 0xc6. For a conventional document this is equivalent to xmlns="". This is Namespace Number 3. Push the Namespace Number onto the Replay Open Namespace Number Stack.

At this step, the processing of the Namespace Table is complete. The replay processor now starts replay with the opcode at offset 0xc6.

To begin replay, the processor presents the Start Element at offset 0xc6 (opcode #15) to the processor. The processor also increments the nesting counter.

In use, the Event Stream presents Namespace Declarations and XML Attributes before the corresponding XML Element. Because of this, the CDATA Section at offset 0xd6 (opcode #16) may be presented to the processor. Further, the End Element at offset 0xe9 (opcode #17) may be presented to the processor. The nesting counter may also be decremented.

At this point, the nesting counter is zero, so processing of opcodes in the byte sequence stops.

The next step is to generate an End Namespace operation for each Start Namespace or Start Default Namespace created as a result of Namespace Table processing.

The next step is to pop the Replay Open Namespace Number Stack. The top element is 3. An End Namespace operation for Namespace #3 is presented to the processor.

The next step is to pop the Replay Open Namespace Number Stack. The top element is 2. An End Namespace operation for Namespace #2 is presented to the processor. At this point, the Replay Open Namespace Number Stack is empty.

An End Document operation is presented to the processor.

The construction of an Index Table may be considered next. An Index Table creates an association between an identifier and an opcode in the Event Stream. An identifier may appear more than once in an Index Table when it is desirable to associate an identifier with more than one opcode in the Event Stream.

During the processing of Information Items of an XML document, the Index Table 700 (FIG. 4) data structure is constructed in a separate area of memory from the sequence of bytes so that it can grow in size during construction of the sequence of bytes without any change to the sequence of bytes previously written. In this regard, it is possible to construct an Index Table which is not part of the Event Stream and is transmitted separately to the destination. This is useful if the Event Stream is to be processed by several independent processors each of which has its own requirements for the items which need to appear in the Index Table.

An Index Table consists of zero or more Index Table Entries with the following information items. The first information item may be an identifier. This identifier can be composed from more than one components as dictated by the needs of the processor.

The next item may be an offset, in bytes, from the start of the byte sequence to an opcode of interest. This offset is a 32 bit integer determined by an Index Table offset processor and does not depend on the memory address of the Event Stream. Because header information precedes any opcode, the values of the offset will never be zero.

The last item may be an Interpretation Flag which determines the interpretation of the Index Table Entry. If the value is 1 then the offset identifies an XML Element and its attributes, but excludes its children. If the value is 2 then the offset identifies an XML Element, its attributes, and all children of the element. Otherwise the offset identifies a single opcode and information item and the value is 0.

The Index Table is created when a Start Document opcode is appended to the sequence of bytes. Any processor whose action results in the formation of an opcode and information item it wishes to add to the Index Table should be able to determine the offset of the formed opcode in the sequence of bytes and must determine whether the proper setting of the Interpretation flag in the Index Table Entry.

A special case is when the information item is an XML Element. Because the XML Attributes belonging to an XML Element appear before the XML Element in the sequence of bytes, it is necessary to use the offset of the first XML Attribute associated with the XML Element of interest if the XML Element has attributes. This creates a potential ambiguity which is resolved by the Interpretation Flag.

When an opcode and information item of interest is formed, a new Index Table Entry is created and the offset is stored in the Index Table Entry along with an Interpretation flag and an identifier chosen by the processor. The Index Table Entry is appended to the Index Table. Thus, the Index Table is a sequential list of Index Table Entries. The processor which creates the Index Table Entry need not be the processor which uses the Index Table Entry.

When the End Document opcode is formed the Index Table is appended to the sequence of bytes. The offset and size of the Index Table are stored in predetermined fields of the header of the sequence of bytes by an Index Table pointer processor.

An item of interest is typically an XML Element or XML Attribute with a particular value for the Namespace uniform resource identifier associated with the XML Element's or XML Attribute's prefix and a particular value for the XML Element's local name.

The processing of the Index Table using a predetermined identifier will be considered next. Recall that the Index Table is a sequential list of Index Table Entries. Each Index Table Entry consists of an identifier and offset to the corresponding information item.

At the destination, the position and size of the Index Table within the Event Stream can be obtained from a predetermined fields in the header of the Event Stream.

To process all the items in an Event Stream with a particular identifier (i.e., the target) the processor iterates over all Index Table Entries in the Index Table. If the identifier in the Index Table Entry matches the target identifier, then the offset in the Index Table identifies the corresponding opcode. If the Interpretation Flag of the Index Table Entry indicates an element with children, then processing of opcodes and information items continues until the End Element matching the Start Element is found. If the Interpretation Flag of the Index Table Entry indicates an element without children, then processing of opcodes and information items stops when processing of the Start Element has completed. If the Interpretation has any other value then the processing of the opcodes and information stops when processing of the selected opcode and information item has completed. If it is desirable to recreate the Namespace Declarations which are visible before processing the opcode and information items then the procedure described above ("Reconstruction of Visible Namespace Declarations") is followed for each selected opcode.

The way the selected items are presented for processing may or may not constitute a valid representation of an XML Document. This may or may not be important. For example, exclusive canonicalization may be applied only to parts of a document. Exclusive canonicalization is an algorithm applied to portions of an XML Document to create a standard or canonical representation before computing a digital signature.

Processing the Index Table in Document Order

Recall that the Index Table is a sequential list of Index Table Entries. Each Index Table Entry consists of an identifier and offset to the corresponding information item.

To process the items in document order the selected offsets are first sorted by the offset value and duplicates are eliminated. The lowest offset value is selected and presented for processing by the destination processor.

If the Interpretation Flag of the Index Table Entry indicates an element with children, then processing of opcodes and information items continues until the End Element matching the Start Element is found.

If the Interpretation Flag of the Index Table Entry indicates an element without children, then processing of opcodes and information items stops when processing of the Start Element has completed. If the Interpretation has any other value then the processing of the opcodes and information stops when processing of the selected opcode and information item has completed.

When processing of the selected item is complete the next unprocessed offset which is greater than the offset of the last processed opcode is selected for processing.

If it is desirable to recreate the Namespace Declarations which are visible before processing the item at the selected offset then the procedure described above in "Reconstruction of Visible Namespace Declarations" is followed.

The way the selected items are presented for processing may or may not constitute a valid representation of an XML Document. This may or may not be important.

Excluding Items from Processing Using The Index Table.

If a single Index Table Entry appears in the Index Table or a single Index Table Entry matches an identifier, then it is possible to exclude it during processing of the Event Stream at the destination. At the destination, as each opcode is fetched from the Event Stream the offset is compared with the offset in the identified Index Table Entry. If the offsets match, then elements may be excluded as follows. First, if the Interpretation Flag of the Index Table Entry identifies an element with children, then all opcodes and information items are skipped until the End Element matching the Start Element is skipped. Alternatively, if the Interpretation Flag of the Index Table Entry identifies an element without children, then all opcodes and information items are skipped until the Start Element has been skipped. Finally, if the Interpretation has any other value then the processing of that opcode and information is skipped. Operation continues with the opcode immediately following the opcodes and information items that were skipped. The way the selected items are presented for processing may or may not constitute a valid representation of an XML Document. This may or may not be important.

The combining of two byte sequences may be considered next. An Event Stream can be combined with another Event Stream by inserting the second byte sequence inside the first at a point where an opcode is allowed to appear. This cannot normally be accomplished by simply splicing the second byte sequence into the first byte sequence for a number of reasons. First, this would likely cause conflicts in the assignment of Namespace Numbers. For instance, both byte sequences might have a Namespace Number 2. Second, the second byte sequence would likely contain opcodes and information items which may appear only before the start of the root element, but splicing would result in them appearing after the start of the root element.

A special processor combines two byte sequences to create a third byte sequence. The processor starts by processing the first byte sequence up to the insertion point. It then starts processing the second byte sequence. The main task of the processor is to reassign the Namespace Numbers when adding the second byte sequence. Since Namespace Number 0 always represents "no namespace" and Namespace Number 1 always represents the "xml" Namespace, it is unnecessary to change the Namespace Number when it is 0 or 1. That is, in the following discussion, when alpha is 0 or 1 then beta will be assigned the value of alpha (0 or 1). Each opcode and information item in the second byte sequence is examined. One of the following cases may apply. First, if the opcode is a Start Namespace opcode with the Namespace Number alpha, then a new Namespace Number, beta. is assigned. Wherever the alpha appears in the second byte sequence it is replaced with beta and written to the new byte sequence.

Second, if the opcode is a Start Default Namespace opcode with the Namespace Number alpha, then a new Namespace Number, beta. is assigned. Wherever the alpha appears in the second byte sequence it is replaced with beta and written to the new byte sequence.

Third, if the opcode is an End Namespace opcode with Namespace Number alpha then the Namespace Number is replaced with beta and written to the new byte sequence. Fourth, if the opcode is a Start Element opcode with Namespace Number alpha then the Namespace Number is replaced with beta and written to the new byte sequence. Fifth, if the opcode is an Attribute opcode with Namespace Number alpha then the Namespace Number is replaced with beta and written to the new byte sequence. Sixth, if the opcode is a Character Data, CDATA Section, Comment, or Processing Instruction opcode then the opcode and information items are copied to the new byte sequence without change.

Any other opcodes which have no information items are replaced with a No-Operation opcode which requires a single byte. Any other opcodes which have a one byte information item are replaced with a No-Operation opcode which skips a single byte. Any other opcodes which have a String information item are replaced with a No-Operation opcode which skips a String information item.

The result of this processing is that the relative position of all opcodes from the second byte sequence is maintained in the new byte sequence.

When the processor reaches the End Document of the second byte sequence it resumes processing the first byte sequence in the normal fashion. The same routines which handle construction of the Namespace Table also handle construction of the Namespace Table for the new byte sequence. The new Namespace Table is appended to the new byte sequence in the manner described previously.

If the second byte sequence has an Index Table all the offsets in it must be adjusted by adding the offset of the insertion point less the size of its header to the offset of each Index Table Entry.

If the first byte sequence has an Index Table, the offset of each Index Table Entry which is greater than the offset of the insertion point must be increased by the size of the second byte sequence less the size of its header.

The two Index Tables are concatenated into a single contiguous byte sequence and appended to the new byte sequence and its offset and size are placed in the appropriate fields of the header of the new byte sequence.

This process does not guarantee that the result is well-formed XML. This depends on the choice of insertion point and the contents of the two byte sequences.

Additional byte sequence instructions may be considered next. The opcode is a one byte integer which can contain values from 0 to 255. Of these, only about 32 are in use. Processors at a source can use additional opcodes to convey information to the destination as long as the source and destination agree on the interpretation of these opcodes.

XSLT formatting may be considered next. The additional opcodes mentioned in claim 25 can be applied to control various XSLT formatting options as described in more detail above. Table 6 lists opcodes which have been added specifically to support formatted output of XML created by XSLT processing:

TABLE 6

| XSLT formatting opcodes | | |
|---|---|---|
| Output Method | 17 | String |
| Output Encoding | 18 | String |
| Output XML Declaration | 19 | 0 or 1 (one byte integer) |
| Output XML "standalone" value | 20 | 0 or 1 (one byte integer) |
| PUBLIC Literal Value | 21 | String |
| SYSTEM Literal | 22 | String |
| Indent Output | 23 | 0 or 1 (one byte integer) |
| Media Type Value | 24 | String |
| End of Output Options | 25 | None |
| Disable Output Escaping UP | 26 | None |
| Disable Output Escaping DOWN | 27 | None |

The output of the system 10 may be provided under a number of different formats. The Output Method may be "xml", "html", or "text".

The output encoding of the system 10 may also be provided under a number of different formats. Output encoding determines the character encoding for the output when the output is rendered as html, xml, or text. Typical values are "utf-8", "utf-16", and "iso-8849-1".

An Output XML Declaration may also be provided. This determines whether <?xml version="1.0" ?> is output when the byte sequence is rendered as a conventional XML Document.

An Output XML "standalone" value may also be provided.

When the byte sequence is rendered as a conventional XML Document the XML Declaration may include standalone="yes" or standalone="no" depending on the value of this information item.

A Public Literal may also be provided. The Public Literal specifies the public literal for XML or HTML output.

A System Literal may also be provided. The System Literal specifies the system literal for XML or HTML output.

An Indent Output may be provided. The Indent Output specifies the indentation style for XML and HTML output.

A Media Type Value may be provided. The Media Type Value is often used to provide hints to the destination about the nature of the document. Typical values are "text/xml" and "text/html".

An End of Output Options may be provided. This tells the processor at the destination that there are no more XSLT related output formatting options. This allows the destination processor to make decisions about the output format which have been deferred because it requires complete knowledge of all output options.

A Disable Output Escaping UP and DOWN may be provided. These two opcodes are used to delimit the text which has disabled output escaping in XML and HTML processing. The Disable Output Escaping counter is incremented by every UP opcode and decremented by every DOWN opcode. While the counter is greater than zero output escaping is disabled.

Hypertext Markup Language Formatting will be considered next. The following items from Table 6 (XSLT formatting opcodes) are appropriate for Hypertext Markup Language output formatting. The Output Method will always be "html" to indicate Hypertext Markup Language formatting conforming to the XSLT standard.

| | | |
|---|---|---|
| Output Method | 17 | String ("html") |
| Output Encoding | 18 | String |
| Indent Output | 23 | 0 or 1 (one byte integer) |
| Media Type Value | 24 | String |
| End of Output Options | 25 | None |
| Disable Output Escaping UP | 26 | None |
| Disable Output Escaping DOWN | 27 | None |

Text Output may be considered next. The following items from Table 6 (XSLT formatting opcodes) are appropriate for text output formatting. The Output Method will always be "text" to indicate text style output conforming to XSLT specifications.

| | | |
|---|---|---|
| Output Method | 17 | String ("text") |
| Output Encoding | 18 | String |
| End of Output Options | 25 | None |

Conventional XML Document Output may be considered next. The following items from Table 6 (XSLT formatting opcodes) are appropriate for conventional XML output formatting. The output method will always be "xml" to indicate xml style output conforming to XSLT specifications.

| | | |
|---|---|---|
| Output Method | 17 | String ("xml") |
| Output Encoding | 18 | String |
| Output XML Declaration | 19 | 0 or 1 (one byte integer) |
| Output XML "standalone" value | 20 | 0 or 1 (one byte integer) |
| PUBLIC Literal Value | 21 | String |
| SYSTEM Literal | 22 | String |
| Indent Output | 23 | 0 or 1 (one byte integer) |
| Output Method | 17 | String ("xml") |
| Media Type Value | 24 | String |
| End of Output Options | 25 | None |
| Disable Output Escaping Up | 26 | None |
| Disable Output Escaping DOWN | 27 | None |

The processing of Event Stream by a client process may be considered next. The processing of an Event Stream by a client process involves an Event Stream format specific program, called a Replay Processor, to interpret the information items contained within an Event Stream, and a client process specific program to handle those information items, called Client Processor. The Replay Processor depends on the Event Stream format but does not depend on the meaning or content of the Event Stream. The Client Processor depends on the meaning and content of the data but does not depend on the Event Stream format.

For Event Streams there are two replay methods, Push Mode and Pull Mode.

In Pull Mode, the client calls the Replay Processor requesting specific information. The normal flow in Pull Mode is as follows. First, the client asks for the event type. The event type is usually closely related to the Event Stream opcode.

Second, the Pull Mode Replay Processor decodes the next uninterpreted opcode using a previously saved address or offset. The new opcode is saved. The Pull Mode Replay Processor decodes the information items associated with the opcode (if any). When the opcode and the information items have been decoded, the address or offset of the opcode which appears next in the byte sequence is saved until it is time to fetch and interpret the next opcode.

Third, the Pull Mode Replay Processor translates the opcode to an event type. In some cases an opcode has no associated event type because no immediate client action is required. In this case control returns to the first step. In most cases there is an event type and control returns the event type to the client.

Fourth, the client makes a multi-way branch based on the event type. There is a branch target for Start Element, a branch target for Start Namespace, a branch target for Character Data, a branch target for CDATA Section, etc.

Fifth, the event type specific code at the branch target makes calls to routines in the Pull Mode Replay Processor to fetch the information related to its operation that were previously decoded in the first step. For instance, a Start Element branch target may make calls to the Pull Mode Replay Processor to get the Namespace Number and the local name. The branch target for a Start Namespace will likely ask the Pull Mode Replay Processor for the Namespace Number, the associated prefix, and uniform resource identifier.

Finally, when the event type specific code in the client finishes execution, the Pull Mode Replay Processor continues with the first step to get the next event type.

Push Mode will be considered next. With a Push Mode Replay Processor, operation begins with the client registering with the Push Mode Processor a Client Processor function for each event type of interest. The event types are usually closely related to the opcode. There will usually be a Client Processor function for Start Element, Start Namespace, Character Data, CDATA Section, etc. The signature of the Client Processor function (the arguments and their types) will depend on the information items associated with the event type. The normal flow in Push Mode is as follows. First, the Push Mode Replay Processor decodes the next uninterpreted opcode from the sequence of bytes.

Second, it does a multi-way branch based on the opcode. There is a branch target for Start Element, a branch target for Start Namespace, a branch target for Character Data, a branch target for CDATA Section, etc.

Third, at the branch target, the information items associated with the opcode are decoded and saved. The address or offset of the opcode which appears next in the byte sequence is saved until it is time to decode and interpret the next opcode in the first step.

Fourth, if there is an event associated with the opcode, the Client Processor function that was registered for this event type is called with arguments specific to the event type. For instance, the Start Namespace Client Processor function will be invoked with the Namespace Number, Namespace prefix, and Namespace uniform resource identifier.

Lastly, when the Client Processor function returns, the Push Mode Replay Processor continues with the first step using the saved address or offset to get the next opcode.

As mentioned earlier, there may be cases where there is no event associated with an opcode. This is the case with Attributes. For compatibility with the de facto standard SAX API designed by David Megginson, all the attribute information for a given XML Element is collected into an array and delivered to the client with the event associated with that Element. The Client Processor function associated with the XML Element is able to access information about each Attribute by using the appropriate information item of the attribute information array. The attribute array does not include the "xmlns" attribute, since this is simply a mechanism for representing Namespace declarations in a conventional XML Document.

In order to make full use of the capabilities of an Event Stream, most of the operations provide an Event Stream offset to the Client Processor. The client can use the Event Stream offsets to build its own Index Table.

Normally, a Replay Processor interprets the opcodes in the Event Stream from start to end, delivering the information items associated with the opcode to the functions of the Client Processor in a way which is convenient for the client. However, the Index Table may be used with a special Index Table Replay Processor to selectively replay opcodes and information items from the Event Stream in either Push Mode or Pull Mode.

The processing of each opcode and its information items for replay is described below. Refer to FIG. 7 for a block diagram of the Replay Processor.

The Replay Prefix Array 300 and the Replay Uri Array 400 are initialized with the two pre-defined Namespace Numbers. First, Namespace Number 0 represents "no namespace". Element 0 of the Replay Prefix Array is set to an empty string. Element 0 of the Replay Uri Array is set to an empty string.

Second, Namespace Number 1 represents the "xml" namespace. Element 1 of the Replay Prefix Array is set to "xml". Element 1 of the Replay Uri Array is set to "http://www.w3.org/XML/1998/namespace".

The Attribute Array 500 is initialized. The Attribute Array consists of Attribute Array Entries. Each Attribute Array Entry contains the following: a field for the XML Attribute's Namespace Number, a field for the XML Attribute's local name, a field for the XML Attribute's value, a field for the XML Attribute's offset, a field for the prefix of the Namespace Number and a field for the uniform resource identifier of the Namespace Number.

The Attribute Array holds all the attribute information associated with an XML Element until it is found in the Event Stream. Recall that in the Event Stream, Attributes appear before the Start Elements with which they are associated.

A Start Namespace may be considered next. The prefix information item is stored in the Replay Prefix Array indexed by the Namespace Number. The uniform resource identifier information item is stored in the Replay Uri Array indexed by the Namespace Number. The Replay Processor presents the offset, Namespace Number, prefix and uri of the Start Namespace to the client processor.

A Start Default Namespace may be considered next. An empty string is stored in the Replay Prefix Array indexed by the Namespace Number. The uniform resource identifier information item is stored in the Replay Uri Array indexed by the Namespace Number. The Replay Processor presents the offset, Namespace Number, and uniform resource identifier of the Start Default Namespace to the client processor.

An End Namespace may be provided. The Namespace Number is passed to the Client Processor. In some implementations, such as the Push Mode Replay Processor, the prefix and uniform resource identifier are also presented to the Client Processor. A Replay Processor obtains the prefix and uri using the Namespace Number to index the Replay Prefix Array and the Replay Uri Array.

A Start Element may be provided. The Start Element contains a Namespace Number information item and a local name information item. The Namespace Number is used to index the Replay Prefix Array for the prefix and the Replay Uri Array for the uniform resource identifier. When the Namespace Number is zero, an empty string is passed used as the prefix and uniform resource identifier because of the way the arrays are initialized. The offset, Namespace Number, prefix, uniform resource identifier, local name, Attribute Array, and the number of items in the Attribute Array are passed to the Client Processor. After the call to the client the Attribute Array is emptied. In some implementation the Namespace Number and local name are pushed onto a stack so that this information is available when the matching End Element is processed.

The Attribute Array Entries contain a Namespace Number, a local name, and an attribute value. The Namespace Number is used to index the Replay Prefix Array for the prefix and the Replay Uri Array for the uniform resource identifier. When the Namespace Number is zero, an empty string is used as the prefix and uniform resource identifier because of the way the arrays are initialized. The offset, Namespace Number, prefix, uniform resource identifier, local name, and attribute value are formed into an Attribute Array Entry and appended to the Attribute Array.

In some Replay Processor implementations the Client Processor function is called without any arguments for an End Element. In other Replay Processor implementation, the Start Element opcode handler saves the Namespace number and local name on a stack. For these implementations, the Namespace Number and local name of the element are popped from the stack. The Namespace Number is used to index the Replay Prefix Array and the Replay Uri Array. When the Namespace Number is zero, an empty string is used as the prefix and uniform resource identifier because of the way the arrays are initialized. The Namespace Number, prefix, and uniform resource identifier, and local name are passed to the Client Processor function.

The XML replay processor may encounter XML Comments. The offset and the data part of the XML Comment are passed to the Client Processor function.

The XML replay processor may also encounter processing instructions. In this case, the offset, target and data information items are passed to the Client Processor function.

The XML replay processor may also encounter Character Data and CDATA elements. The offset and the data are passed to the Client Processor function.

The replay processor may encounter End Document elements. The offset is passed to the Client Processor function.

No-operation opcodes may also be encountered. The no-operation opcodes are decoded in order to determine the address or offset of the next opcode. However, the data is ignored.

In another embodiment, matching of Unicode encoded under the format UTF-8 will be considered next. The ISO/IEC-10646 standard supports Unicode characters with code points as large as $2^{21-1}$. However, in many applications the most common characters are less than $2^{7-1}$ and can be represented in a single 8-bit byte. The utf-8 format ("Unicode Transformation Format-8 bit") defined by ISO/IEC-10646 is a widely used method of encoding Unicode characters in one to four bytes that is compact, compatible with US ASCII ("American Standard Code for Information Interchange") and allows the full range of Unicode characters to be represented.

The actual encoding for utf-8 depends on the number of bits required to represent the character as a number according to the following rules, where x represents bits from the character, and a vertical bar ("|") separates bytes in multi-byte encodings:

For values 0 to 127 (represented with 7 data bits or fewer), 1 byte has the format: 0xxx xxxx For values 128 to 2,047 (more than 7 bits, but no more than 11 bits), 2 bytes have the format:
110x xxxx|10xx xxxx For values 2,048 to 65,535 (more than 11 bits, but no more than 16 data), 3 bytes have the format:
1110 xxxx|10xx xxxx|10xx xxxx For values 65,536 to 2,097,151 (more than 16 bits, but no more than 21 bits), 4 bytes have the format: 1111 0xxx|10xx xxxx|10xx xxxx|10xx xxxx In an XML parser, it is often necessary to test whether the next input character is from a particular set of Unicode characters (e.g. an XML name may include values for 0x0250 to 0x2a8, the letters A to Z and a to z, as well as approximately 100 other ranges of characters from the Unicode character set.

For purposes of illustration, the problem of recognizing Unicode characters may be considered which are in the range 0x0250 to 0x2a8. The character 0x250 is represented by the utf-8 byte sequence (octal) 311 220. The character 0x2a8 is represented by the utf-8 byte sequence (octal) 312 250. To represent the range from 0x250 to 0x2a8 (hexadecimal 250 to hexadecimal 2a8), it is convenient to separate the values that start with (octal) 311 and those which start with (octal) 312. The range that starts with (octal) 311 are 311 220 through 311 277. The range that starts with (octal) 312 is 312 200 through 312 250. The following ranges are invalid utf-8 (see FIG. 8):

(octal) 311 000 through 311 177 (inclusive)
(octal) 311 300 through 311 377 (inclusive)
(octal) 312 000 through 312 177 (inclusive)
(octal) 312 300 through 312 377 (inclusive).

The normal method of handling this, as shown in FIG. 9, is to reverse the utf-8 encoding in order to recover the original character values by a series of steps: 1) Check the control bits for consistency with utf-8 encoding rules so that invalid utf-8 sequences are not accepted (e.g. 311 000), 2) Stripping off the control bits, 3) Combining data bits from separate bytes to create a single number and 4) Comparing the number with the range of acceptable characters using arithmetic comparison or a bit map. This is a relatively slow process.

A common method of quickly recognizing a complex string is a regular expression pattern matcher using a finite-state-machine generated by programs such as flex (Vern Paxson, Lawrence Berkeley Laboratory). However, regular expression programs cannot easily handle arithmetic comparison required for determining whether one multi-byte sequence is larger than another multi-byte sequences. In contrast, comparison of single byte sequences is trivial.

To illustrate the operation of a lexical analyzer such as flex, we consider the simple case of recognizing "dog" and "pig" and rejecting all other sequences when reading the input one character at a time from left to right. This is depicted in FIG. 10.

These operations are relatively fast since processing each byte of the input sequence involves an index into a table of letters.

The operation is more complicated for utf-8 because ranges of words must be recognized. To continue with this analogy, this would be comparable to accepting all three letter words between "dog" and "pig" inclusive. This is depicted in FIG. 11. This requires the introduction of many extra states (nine in FIG. 11 compared to five in FIG. 10).

Adding to the above example, if the alphabet is extended to include the digits 0 to 9 as well as letters, and we stipulate that no word should contain any digit, then the role of digits is somewhat analogous to control bits in a utf-8 sequence. Thus neither "e88" nor "pi8" should be accepted even though the character '8' is less than the character 'g' (in US ASCII.). Actually, the task is slightly more complex, as there are other characters which are part of US ASCII which are larger than letters as well as digits which are smaller than letters (e.g. "]").

To properly handle those US ASCII characters which are both smaller and larger than letters and exclude them from matching words between "dog" and "pig" would require a change in the number of states. This change in the number of states in FIG. 11 would increase the number from nine to 21.

Since the definition of a letter in XML involves over 200 characters and character ranges, this method of describing the multi-byte character (which constitute the set of Unicode letters in utf-8) gets quite complicated. The expression of such lexical pattern matching expressions for Unicode characters and ranges may be mitigated by using an algorithm that takes the Unicode characters and ranges as input and generates the flex pattern matching expressions as output.

The method of comparing and validating ranges of utf-8 multi-byte sequences lexicographically using a finite state machine is a considerable improvement over prior art methods.

The implementation of the new algorithm is embedded in a pre-processor which recognizes special syntax for such expressions in flex source code and replaces these special expressions with flex compatible regular expressions. Let L represent the byte sequence for the lower bound of the range and let U represent the byte sequence for the upper bound of the range. Without loss of generality, we may assume that L and U are the same length, N bytes. Let l represent the first byte of L and let u represent the first byte of U. Let L' represent the part of L which follows the first byte of L. Let U' represent the part of U which follows the first byte of U. Both U' and L' are (N−1) bytes long, so they may be empty byte sequences if N=1. The method may be expressed as follows:

1. If L and U are one byte long then generate the built-in flex pattern to match the range l to u.
2. If L and U are longer than one byte then examine the first byte of L and U (namely l and u):
   a. If l and u are equal then generate code to match the first byte and invoke this algorithm recursively to process L' and U' (the remaining bytes of L and U).
   b. Otherwise, l and u are not equal. Divide the range covered by L and U into three sections:
      i. Generate a pattern to match l, the first character of L, and then invoke this algorithm recursively to match the range starting with L' (the remainder of L) up to the maximum value that is inside the range and can be represented by a byte sequence starting with the byte l.
      ii. Generate a pattern to match u, the first character of U, and then invoke this algorithm recursively to match the range starting with the minimum value that is inside the range that can be represented by a byte sequence starting with the byte u up to U' (the remaining bytes of U).
      iii. If u>(l+1) then generate a pattern to match the range from (l+1) to (u−1):

For each value of m from (l+1) to (u−1) invoke this algorithm recursively to match the range from the minimum value of a sequence beginning with a byte with value (m) to the maximum value of a sequence beginning with a byte of value (m).

For example, given the input {\u0250-\u02a8} the preprocessor generates the flex expression:

(\311[\220-\277]|\312[\200-\250])

Where:

\311 represent a byte containing the octal number 311.
[\220-\277] matches a byte containing a value between octal 220 and octal 277.

A vertical bar ("|") represents disjunction ("or"). \
\312 represent a byte containing the octal number 312.
[\200-\250] matches a byte containing a value between octal 200 and octal 250.
( . . . ) groups operations to indicate precedence and order of operations.

```
This represents the rule:
    If byte 1 contains 311
        and byte 2 is between 220 and 277
            then accept
    or if byte 1 contains 312
        and byte 2 is between 200 and 250
            then accept
        otherwise reject.
Given the input {\u80002-\u100003}, the preprocessor generates
the flex expression:
    (\362(\200(\200 [\202-\277] | [\201-\277] [\200-\277] | [\201-
    \277] [\200-\277] [\200-\277]) | \363 [\200-\277] [\200-
    \277] [\200-\277] | \364\200\200[\200-\203])
This represents the rule:
    If byte 1 contains 362
        and byte 2 contains 200
            and byte 3 is 200
                and byte 4 is between 202 and 277
                    then accept
                or byte 3 is between 201 and 277
                    and byte 4 is between 200 and 277
                        then accept
            or byte 2 is between 201 and 277
                and byte 3 is between 200 and 277
                    and byte 4 is between 200 and 277
                        then accept
        or byte 1 contains 363
            and byte 2 contains 200 to 277
                and byte 3 contains 200 to 277
                    and byte 4 contains 200 to 277
                        then accept
        or byte 1 contains 364
            and byte 2 contains 200
                and byte 3 contains 200
                    and byte 4 contains 200 to 203
                        then accept
    otherwise reject.
```

In general, the above method of handling Unicode provides a reliable method of verifying that a sequence of bytes (representing one or more Unicode characters) conforms to the definition of one of several XML lexical items ("tokens") when the Unicode characters providing the lexical item are encoded according to ISO/IEC-10646 utf-8 format ("Unicode Transformation Format-8 bit") without conversion of each sequence of bytes representing a single Unicode character to the Unicode character represented by that sequence of bytes. This method is not limited to ISO/IEC-10646 utf-8 format but is applicable to other methods of encoding a Unicode character which sometimes utilize more than one byte per Unicode character.

The above description also provides a reliable method of verifying that a sequence of bytes representing one or more Unicode characters conforms to the definition of one of several XML lexical items ("tokens") when the Unicode characters providing the lexical item are encoded according to ISO/IEC-10646 utf-8 format ("Unicode Transformation Format-8 bit") without the need to identify which bytes are associated with each Unicode character that makes up the lexical item. This method is not limited to ISO/IEC-10646 utf-8 format but is applicable to other methods of encoding a Unicode character which sometimes utilize more than one byte per Unicode character.

A specific embodiment of method and apparatus for processing a representation of an XML document has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method comprising:
   parsing, by a system, a representation of an XML document into a set of information items;
   determining, by the system, a relationship among the information items from the representation of the XML document;
   assigning, by the system, an operation code to each information item based upon the determined relationship, where each assigned operation code defines how the associated information should be interpreted at a destination;
   forming, by the system, the operation codes and information items into a first sequence of contiguous bytes suitable for transfer from a source to the destination, said first sequence of contiguous bytes not depending upon any memory address assigned to the byte sequence; and
   combining, by the system, the first sequence of contiguous bytes derived from the representation of the first XML document with a second sequence of contiguous bytes derived from a second XML document, the combining including replacing first namespace numbers of at least some operations codes of the second sequence of contiguous bytes with second namespace numbers to avoid conflicts with namespace numbers of the first sequence of contiguous bytes.

2. The method of claim 1 wherein the representation of the XML document further comprises a World Wide Web Consortium Document Object Model.

3. The method of claim 1 wherein the representation of the XML document further comprises a representation provided by an application programming interface for XML.

4. The method of claim 1 wherein the representation of the XML document further comprises a conventional XML document.

5. A system comprising:
   one or more processors; a storage medium storing logic; and the
   logic operated by the one or more processors and adapted to
       parse a representation of an XML document into a set of information items;

determine a relationship among the information items from the representation of the XLM document;

assign an operation code to each information item based upon the determined relationship, where each assigned poeration code defines how the associated information should be interpreted at a destination;

form the operation codes and information items into a first sequence of contiguous bytes suitable for transfer from a source to the destination, said first sequence of contiguous bytes not depending upon any memory address assigned to the byte sequence; and combine the first sequence of contiguous bytes derived from the representation of the first XML document with a second sequence of cotiguous bytes derived from a second XML document, the combining including replacing first namespace numbers of at least some operations codes of the second sequence of contiguous bytes with second namespace numbers to avoid conflicts with namespace numbers of the first sequence of contiguous bytes.

6. The system of claim 5 wherein the representation of the XML document further comprises a World Wide Web Consortium Document Object Model.

7. The system of claim 5 wherein the representation of the XML document further comprises a representation provided by an application programming interface for XML.

8. The system of claim 5 wherein the representation of the XML document further comprises a conventional XML document.

* * * * *